US011452659B2

(12) United States Patent
Farris et al.

(10) Patent No.: US 11,452,659 B2
(45) Date of Patent: Sep. 27, 2022

(54) LEGGED MOBILITY EXOSKELETON DEVICE WITH ENHANCED ACTUATOR MECHANISM EMPLOYING MAGNETIC/ELECTRICAL COUPLING

(71) Applicant: Parker-Hannifin Corporation, Cleveland, OH (US)

(72) Inventors: Ryan Farris, Solon, OH (US); Steven Etheridge, Macedonia, OH (US); Scott Morrison, Macedonia, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 815 days.

(21) Appl. No.: 16/338,891

(22) PCT Filed: Jan. 17, 2018

(86) PCT No.: PCT/US2018/013996
§ 371 (c)(1),
(2) Date: Apr. 2, 2019

(87) PCT Pub. No.: WO2018/147982
PCT Pub. Date: Aug. 16, 2018

(65) Prior Publication Data
US 2021/0275382 A1    Sep. 9, 2021

Related U.S. Application Data

(60) Provisional application No. 62/456,307, filed on Feb. 8, 2017.

(51) Int. Cl.
*A61H 3/00* (2006.01)
*A61H 1/02* (2006.01)

(52) U.S. Cl.
CPC ............... *A61H 3/00* (2013.01); *A61H 1/024* (2013.01); *A61H 2201/1215* (2013.01);
(Continued)

(58) Field of Classification Search
CPC ........ A61H 3/00; A61H 1/024; A61H 1/0244; B25J 9/0006; H02K 49/102; H02K 49/104; H02K 49/106; H02K 49/108
(Continued)

(56) References Cited

U.S. PATENT DOCUMENTS 6,764,520 B2    7/2004    Deffenbaugh et al.
8,273,042 B2    9/2012    Lidolt et al.
(Continued)

FOREIGN PATENT DOCUMENTS

DE    102011054956 A1    5/2013
GB    2512074 A    9/2014
(Continued)

OTHER PUBLICATIONS

International Search Report and Written Opinion of PCT/US2018/013996 dated Apr. 20, 2018.

*Primary Examiner* — Samchuan C Yao
*Assistant Examiner* — Nathan M Le
(74) *Attorney, Agent, or Firm* — Renner, Otto, Boisselle & Sklar, LLP

(57)    ABSTRACT

A joint actuator assembly incudes a motor, a rotating driving member driven by the motor for driving a driven component, and a transmission assembly located between the motor and the rotating driving member that provides speed reduction from the motor to the rotating driving member. The rotating driving member includes a magnetic/electrical coupling comprising a magnetic coupling component configured to magnetically couple with an opposing magnetic coupling of the driven component, and an electrical element configured to provide an electrical connection to an opposing electrical element of the driven component. The actuator and driven component may be combined into a mobility device including a magnetic/electrical coupling system comprising a first (Continued)

magnetic/electrical coupling on the actuator assembly that magnetically and electrically couples to a second magnetic/electrical coupling on the driven component. The magnetic coupling system includes a plurality of magnetic elements located on the first and/or second magnetic/electrical couplings and opposing electrical elements for electrical connection when the actuator assembly and the driven component are joined together.

20 Claims, 17 Drawing Sheets

(52) U.S. Cl.
CPC ........... *A61H 2201/1463* (2013.01); *A61H 2201/164* (2013.01); *A61H 2201/165* (2013.01); *A61H 2205/088* (2013.01); *A61H 2205/102* (2013.01); *A61H 2205/106* (2013.01); *A61H 2205/108* (2013.01)

(58) Field of Classification Search
USPC .......................................... 310/83, 99, 103
See application file for complete search history.

(56) References Cited

U.S. PATENT DOCUMENTS

| | | |
|---|---|---|
| 9,155,634 B2 | 10/2015 | Lipschutz et al. |
| 2004/0066107 A1* | 4/2004 | Gery ................... H02K 49/106 310/114 |
| 2013/0093550 A1* | 4/2013 | Piascik .................... H01F 5/04 335/299 |
| 2014/0225462 A1* | 8/2014 | Yamada ............... H02K 1/2713 310/44 |
| 2016/0038314 A1* | 2/2016 | Kuiken ................ A61F 2/7812 623/36 |
| 2018/0133905 A1* | 5/2018 | Smith .................. B25J 17/0241 |
| 2019/0103219 A1* | 4/2019 | Sakai ...................... A61H 3/00 |
| 2019/0214883 A1* | 7/2019 | Klassen .................. B25J 9/126 |

FOREIGN PATENT DOCUMENTS

| | | |
|---|---|---|
| JP | 2008221393 A | 9/2008 |
| WO | WO 2014/070672 A1 | 5/2014 |
| WO | WO 2015/153633 | 10/2015 |

* cited by examiner

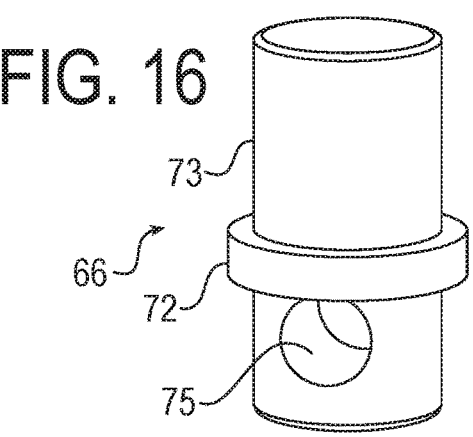
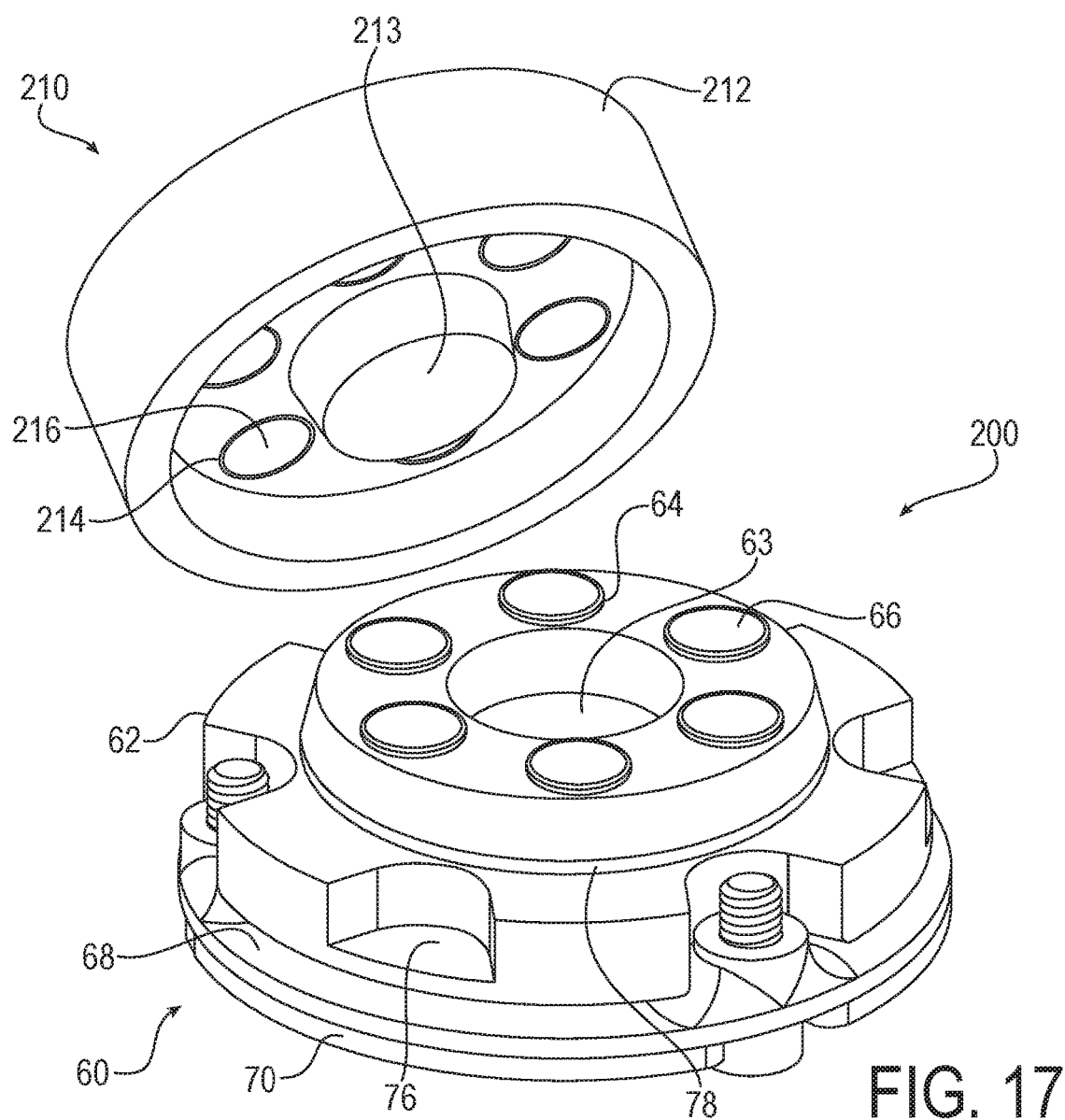

LEGGED MOBILITY EXOSKELETON DEVICE WITH ENHANCED ACTUATOR MECHANISM EMPLOYING MAGNETIC/ELECTRICAL COUPLING

RELATED APPLICATION DATA

This application is a national stage application pursuant to 35 U.S.C. § 371 of PCT/US2017/013996 filed on Jan. 17, 2018, which claims the benefit of U.S. Provisional Application No. 62/456,307 filed Feb. 8, 2017, the contents of which are incorporated herein by reference.

FIELD OF INVENTION

The present invention relates to movement assist devices, such as a legged mobility device or "exoskeleton" device, and more particularly to drive mechanisms and coupling components for driving the joint components of such devices.

BACKGROUND OF THE INVENTION

There are currently on the order of several hundred thousand spinal cord injured (SCI) individuals in the United States, with roughly 12,000 new injuries sustained each year at an average age of injury of 40.2 years. Of these, approximately 44% (approximately 5300 cases per year) result in paraplegia. One of the most significant impairments resulting from paraplegia is the loss of mobility, particularly given the relatively young age at which such injuries occur. Surveys of users with paraplegia indicate that mobility concerns are among the most prevalent, and that chief among mobility desires is the ability to walk and stand. In addition to impaired mobility, the inability to stand and walk entails severe physiological effects, including muscular atrophy, loss of bone mineral content, frequent skin breakdown problems, increased incidence of urinary tract infection, muscle spasticity, impaired lymphatic and vascular circulation, impaired digestive operation, and reduced respiratory and cardiovascular capacities.

In an effort to restore some degree of legged mobility to individuals with paraplegia, several lower limb orthoses have been developed. The simplest form of such devices is passive orthotics with long-leg braces that incorporate a pair of ankle-foot orthoses (AFOs) to provide support at the ankles, which are coupled with leg braces that lock the knee joints in full extension. The hips are typically stabilized by the tension in the ligaments and musculature on the anterior aspect of the pelvis. Since almost all energy for movement is provided by the upper body, these passive orthoses require considerable upper body strength and a high level of physical exertion, and provide very slow walking speeds.

The hip guidance orthosis (HGO), which is a variation on long-leg braces, incorporates hip joints that rigidly resist hip adduction and abduction, and rigid shoe plates that provide increased center of gravity elevation at toe-off, thus enabling a greater degree of forward progression per stride. Another variation on the long-leg orthosis, the reciprocating gait orthosis (RGO), incorporates a kinematic constraint that links hip flexion of one leg with hip extension of the other, typically by means of a push-pull cable assembly. As with other passive orthoses, the user leans forward against a stability aid (e.g., bracing crutches or a walker) while un-weighting the swing leg and utilizing gravity to provide hip extension of the stance leg. Since motion of the hip joints is reciprocally coupled through the reciprocating mechanism, the gravity-induced hip extension also provides contralateral hip flexion (of the swing leg), such that the stride length of gait is increased. One variation on the RGO incorporates a hydraulic-circuit-based variable coupling between the left and right hip joints. Experiments with this variation indicate improved hip kinematics with the modulated hydraulic coupling.

To decrease the high level of exertion associated with passive orthoses, the use of powered orthoses has been under development, which incorporate actuators and drive motors associated with a power supply to assist with locomotion. These powered orthoses have been shown to increase gait speed and decrease compensatory motions, relative to walking without powered assistance. The use of powered orthoses presents an opportunity for electronic control of the orthoses, for enhanced user mobility.

An example of the current state of the art of exoskeleton devices is shown in Applicant's co-pending International Application Serial No. PCT/US2015/23624, entitled "Wearable Robotic Device," filed 31 Mar. 2015. Such device is representative of an effective and generally user friendly exoskeleton device. There is a general concern with exoskeleton devices that they be compact and light weight. Device users typically have significant physical impairments, and reducing the size and weight of exoskeleton devices makes them easier to don and otherwise manipulate. With increased ease, users can experience more freedom of mobility, and can reduce the need for outside caregivers and assistance.

The drive mechanism for the joint components is one aspect of exoskeleton devices that is a continuing subject of concern for rendering exoskeleton devices more compact and light weight. Reduced size and weight must be balanced with performance so as to provide a device that is more user friendly to don and manipulate, while still providing adequate torque and driving forces for operation of the exoskeleton device.

In a recent survey of 354 wheelchair users and 127 healthcare professionals "ease of putting on and taking off the device" was rated as "very important", and "portability of the device" was rated as "important", (Wolff et al, A Survey of Stakeholder Perspectives on Exoskeleton Technology, JNER 2014.) Conventional legged mobility devices often incorporate two full leg braces or leg components rigidly connected to a common hip brace or hip component. This conventional arrangement of a lower leg, upper leg, and hip components will generally articulate at each knee joint and each hip joint, making the device cumbersome to handle when it is being worn by a user. Additionally, the weight of each segment may be significant, particularly if actuation components and batteries are incorporated.

To address the cumbersome nature of a fully assembled legged mobility device, such a system may be designed with modular components that are handled separately and are connected together during the donning process. Electrical connections as well as physical connections must be provided between an actuator assembly and a driven component through a joint, for example to provide electrical power to the actuators and signal communication between each leg or other limb component of a powered orthosis.

Establishing such electrical connections for power and signal transmission typically requires passing electrical wires through or around multiple articulating joints. For reasons of safety, it is desirable to eliminate exposed wires from a device such as this, specifically to remove the risk of snagging wires during use. Passing electrical wires through or around multiple articulating joints has additional deficiencies, including for example reliability and durability issues as the wiring across a joint is a common failure point. Another significant issue with passing electrical wires across these articulating joints is that it also undermines the ability to provide a device with the referenced modularity, as is preferred. To enable or enhance modularity, which is important for both donning/doffing and portability of the exoskeleton system, conventional systems that are employed to connect a driven component to the actuator assembly are deficient.

SUMMARY OF THE INVENTION

The present invention is directed to movement assist devices such as powered limb or gait orthoses or wearable robotic legged mobility devices or "exoskeletons," and more particularly to coupling mechanisms and drive mechanisms for driving the joint components of such devices. An aspect of the invention is an actuator assembly that includes an enhanced magnetic/electrical coupling system, which provides for electrical connection of the actuator assembly to a driven component when such components are coupled mechanically. The present invention provides an easy-to-use, robust magnetic/electrical coupling system that provides an electrical connection using magnetic coupling, which is self-aligning, self-drawing, and performs well for both power transmission and signal transmission.

In exemplary embodiments, the magnetic/electrical coupling system of the present invention provides for a self-aligning, self-drawing magnetic/electrical coupling configured as a two-part coupling system with a magnetic receptacle located in a rotational center of a driven component, and a ferrous or magnetic plug located in a rotational center of a rotating driving member (e.g., output reel) of an actuator assembly. The magnetic receptacle may be constructed of a non-conductive (e.g. plastic) cylindrical housing with multiple radially spaced through-holes (e.g., six in an exemplary embodiment) containing neodymium magnetic elements, each plated with a conductive metal (e.g., nickel in an exemplary embodiment). The magnetic elements may be permanently installed in the through-holes of the receptacle, and electrical wires for power transmission and signal transmission are soldered directly to a backside of each magnetic element. Thus, a wire harness is formed with the magnetic receptacle serving as a final electrical terminal on one end, and accordingly the magnetic receptacle also is referred to herein also as a terminal receptacle. The terminal receptacle is affixed to the driven component (e.g., the hip brace or driven limb component of an exoskeleton device) in the center of rotation of the driven joint component.

The ferrous plug of the rotating driving member similarly may be constructed of a non-conductive cylindrical housing with a matching pattern relative to the terminal receptacle of radially spaced through-holes. The through-holes of the housing may include a ferrous contact installed into each through-hole, and the ferrous contacts may be plated with a conductive metal (e.g., nickel in an exemplary embodiment). The ferrous contacts may be designed to be undersized relative to a diameter of the ferrous plug through-holes, and with a shoulder. This configuration including a shoulder allows the ferrous contacts to float within axial limits in the ferrous plug housing, ensuring that full contact can be made with each respective magnetic element in the terminal receptacle. Similarly to the magnetic elements of the terminal receptacle, electrical wires for power and signal transmission may be soldered directly to a backside of each ferrous contact to provide opposing electrical wires in the components, which establishes an electrical connection between the terminal receptacle on the driven component and the ferrous plug on the actuator assembly when the two components are mechanically joined together.

The ferrous plug housing may be mechanically keyed on its outer diameter to matched keying features present in a bore defined by the actuator output reel. The keying features are undersized on the ferrous plug housing to allow for the entire ferrous plug to float slightly within the output reel. A shoulder on the ferrous plug housing limits forward axial travel, and a snap ring and non-conductive washer may be installed below the ferrous plug to limit backward axial travel of both the ferrous plug housing as well as the ferrous contacts within the ferrous plug housing. As magnetic coupling draws the driven component into mechanical connection with the rotating driving member (output reel) of actuator assembly, the magnetic terminal receptacle draws the ferrous plug into electrical union via the opposing electrical wires on each component. Accordingly, each magnetic coupling of the terminal receptacle and the ferrous plug serves both to draw the components together into a mechanical connection, and also establishes an electrical connection itself.

In an exemplary embodiment of six magnetic elements in the terminal receptacle, each of the six magnetic elements may provide 1.5 pounds of holding force with an opposing ferrous contact in the ferrous plug, for a total holding force of 9 pounds. This 9 pounds of holding force acts to prevent the electrical connection from separating and being lost during use of the mobility device. In testing, the resultant electrical connection has exhibited minimal resistive losses across the power transmission contacts, and excellent signal integrity across the signal contacts when transmitting a 2 MHz square wave across the signal contacts, even during impact and vibration. The float provided in the ferrous plug further allows for a partial mechanical disengagement of the magnetic coupling system without dropping the electrical connection.

In another exemplary embodiment, the ferrous contacts in the ferrous plug housing instead may be configured as additional magnetic elements to form a magnetic plug. The magnet polarity between the terminal receptacle and a magnetic plug may be alternated in a way that provides magnetic keying which disallows improper mating alignment of the driven component and the actuator assembly. This magnetic keying provides for self-aligning components.

In accordance with such features, an aspect of the invention is a joint actuator assembly including an enhanced magnetic/electrical coupling. In exemplary embodiments, a joint actuator assembly incudes a motor, a rotating driving member driven by the motor for driving a driven component, and a transmission assembly located between the motor and the rotating driving member that provides speed reduction from the motor to the rotating driving member. The rotating driving member includes a magnetic/electrical coupling comprising at least one magnetic coupling component configured to magnetically couple with an opposing magnetic coupling of the driven component, and an electrical element configured to provide an electrical connection to an opposing electrical element of the driven component when the actuator assembly and the driven component are mechanically jointed together.

The actuator and driven component may be combined into a mobility device including a magnetic/electrical coupling system comprising a first magnetic/electrical coupling on the actuator assembly that magnetically and electrically couples to a second magnetic/electrical coupling on the driven component. The magnetic coupling system includes a plurality of magnetic elements located as part of one or both of the first and/or second magnetic/electrical couplings. The first magnetic/electrical coupling includes an electrical element configured to provide an electrical connection to an opposing electrical element of the second magnetic/electrical coupling when the actuator assembly and the driven component are joined together. The first magnetic/electrical coupling may be configured as a ferrous plug, and the second magnetic/electrical coupling may be configured as a magnetic receptacle, wherein when the couplings are joined together by magnetic coupling, electrical connections are established between opposing electrical elements in the couplings.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIG. 16 depicts an isometric view of an exemplary ferrous contact in isolation, which may be employed in the ferrous plug of FIGS. 14 and 15, in accordance with embodiments of the present invention.

FIG. 17 is a drawing depicting an isometric view of an exemplary magnetic/electrical coupling system in accordance with embodiments of the present invention, including the ferrous plug of FIGS. 14 and 15 in combination with a second magnetic/electrical coupling configured as a magnetic receptacle of a driven component, the magnetic receptacle being shown from a bottom viewpoint.

DETAILED DESCRIPTION

Figure 1:
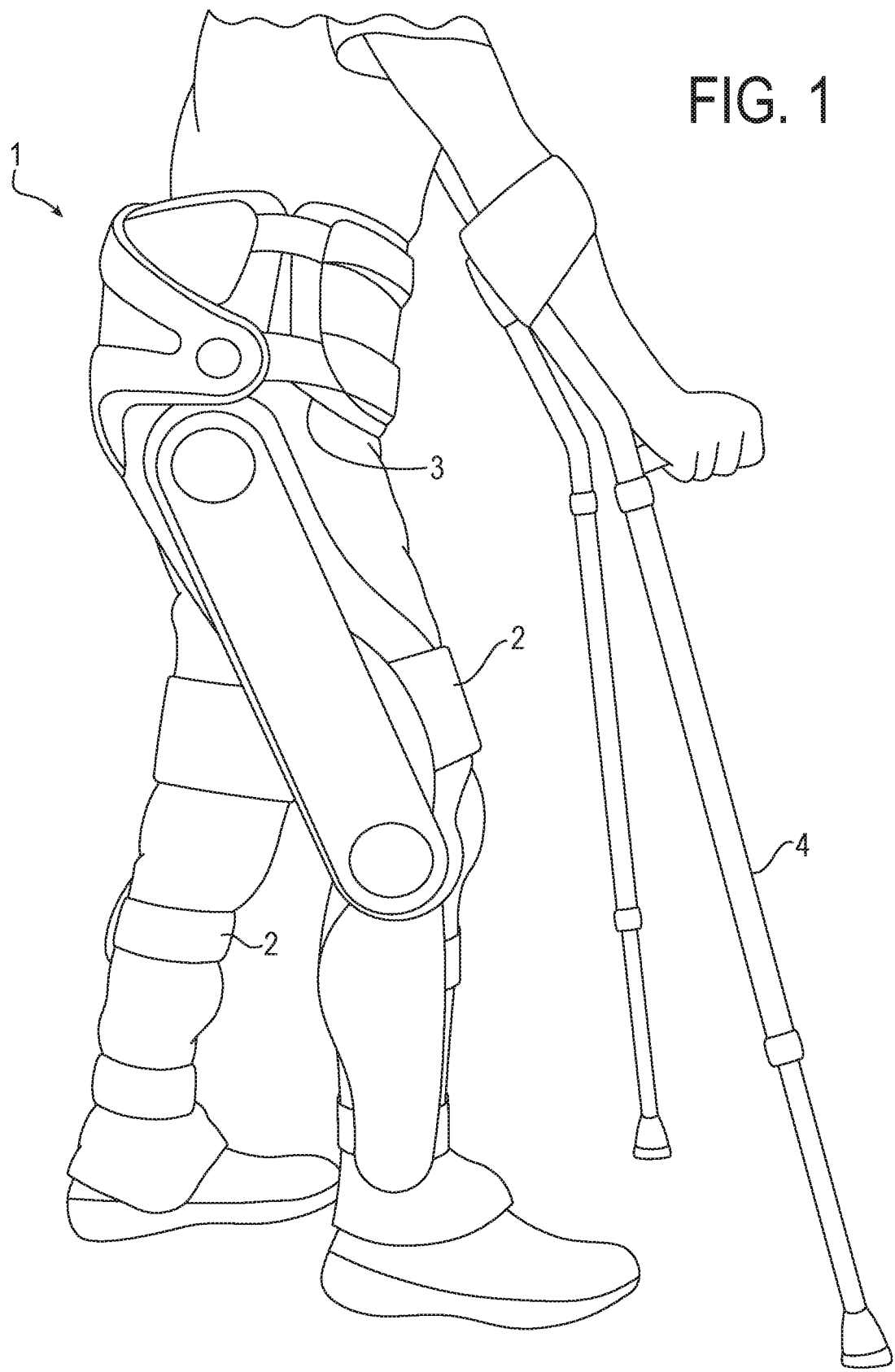
FIG. 1 is a drawing depicting an exemplary exoskeleton device as being worn by a user.

Embodiments of the present invention will now be described with reference to the drawings, wherein like reference numerals are used to refer to like elements throughout. It will be understood that the figures are not necessarily to scale.

For context, FIGS. 1-11 depict various views of an exemplary exoskeleton device that may be used in connection with the magnetic/electrical coupling system of the present invention. A somewhat generalized description of such exoskeleton device is provided here for illustration purposes. A more detailed description of such device may be found in Applicant's International Patent Appl. No. PCT/US2015/023624 filed on Mar. 3, 2015, which is incorporated here in its entirety by reference. It will be appreciated, however, that the described exoskeleton device presents an example usage, and that the features of the magnetic/electrical coupling system of the present invention are not limited to any particular configuration of an exoskeleton device. Variations may be made to the exoskeleton device, while the features of the present invention remain applicable. In addition, the principles of this invention may be applied generally to any suitable mobility device. Such mobility devices include, for example, orthotic devices which aid in mobility for persons without use or limited use of a certain body portion, and prosthetic devices, which essentially provide an electro-mechanical replacement of a body part that is not present such as may be used by an amputee or a person congenitally missing a body portion. The mobility devices may be configured as or include lower and/or upper joint components either individually or in combination as a unitary component.

As show in FIG. 1, an exoskeleton device 1, which also may be referred to in the art as a "wearable robotic device", can be worn by a user. To attach the device to the user, the device 1 can include attachment devices 2 for attachment of the device to the user via belts, loops, straps, or the like. Furthermore, for comfort of the user, the device 1 can include padding 3 disposed along any surface likely to come into contact with the user. The device 1 can be used with a stability aid 4, such as crutches, a walker, or the like.

Figure 2:
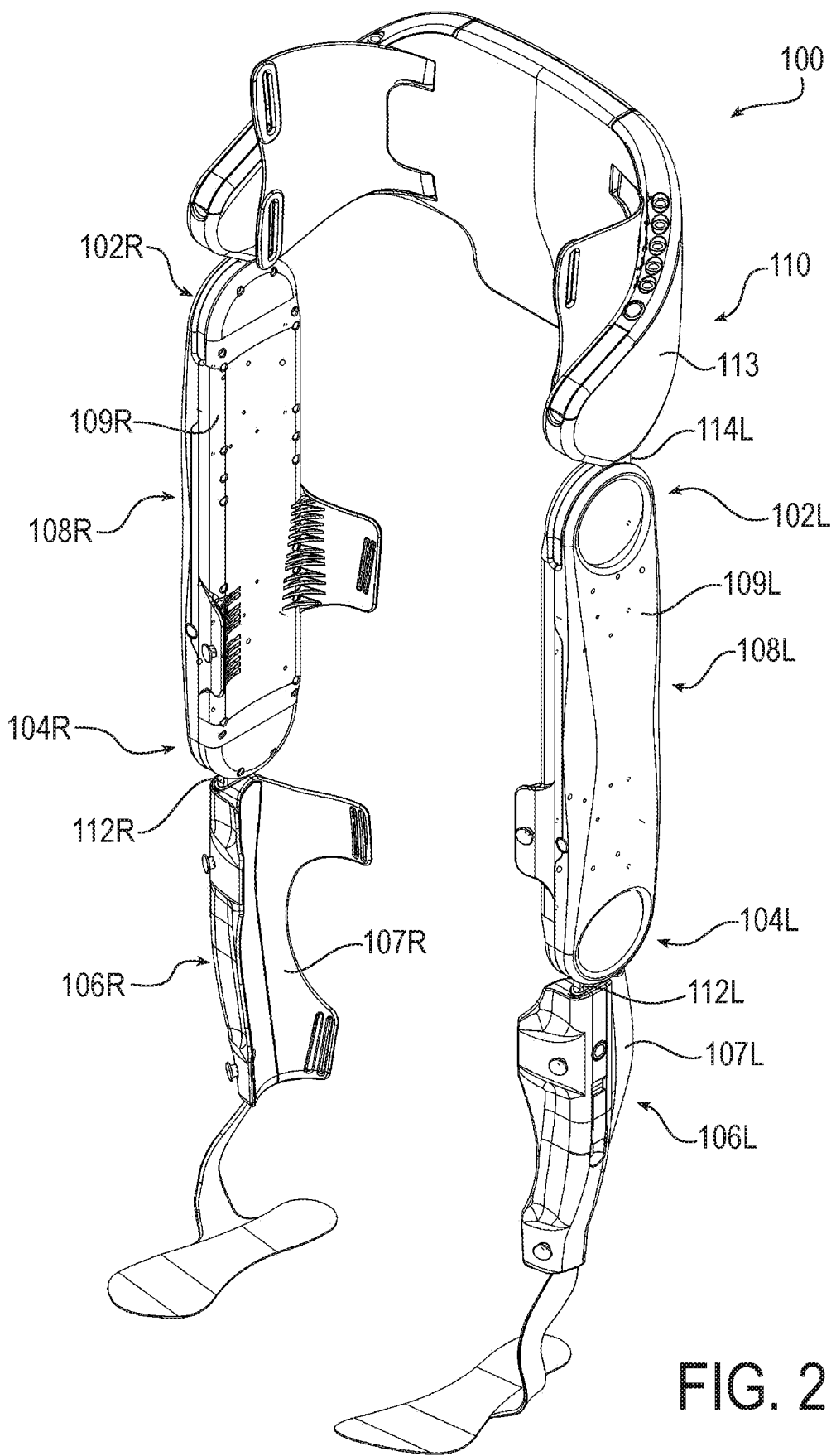
FIG. 2 is a drawing depicting a perspective view of an exemplary exoskeleton device in a standing position.
Figure 3:
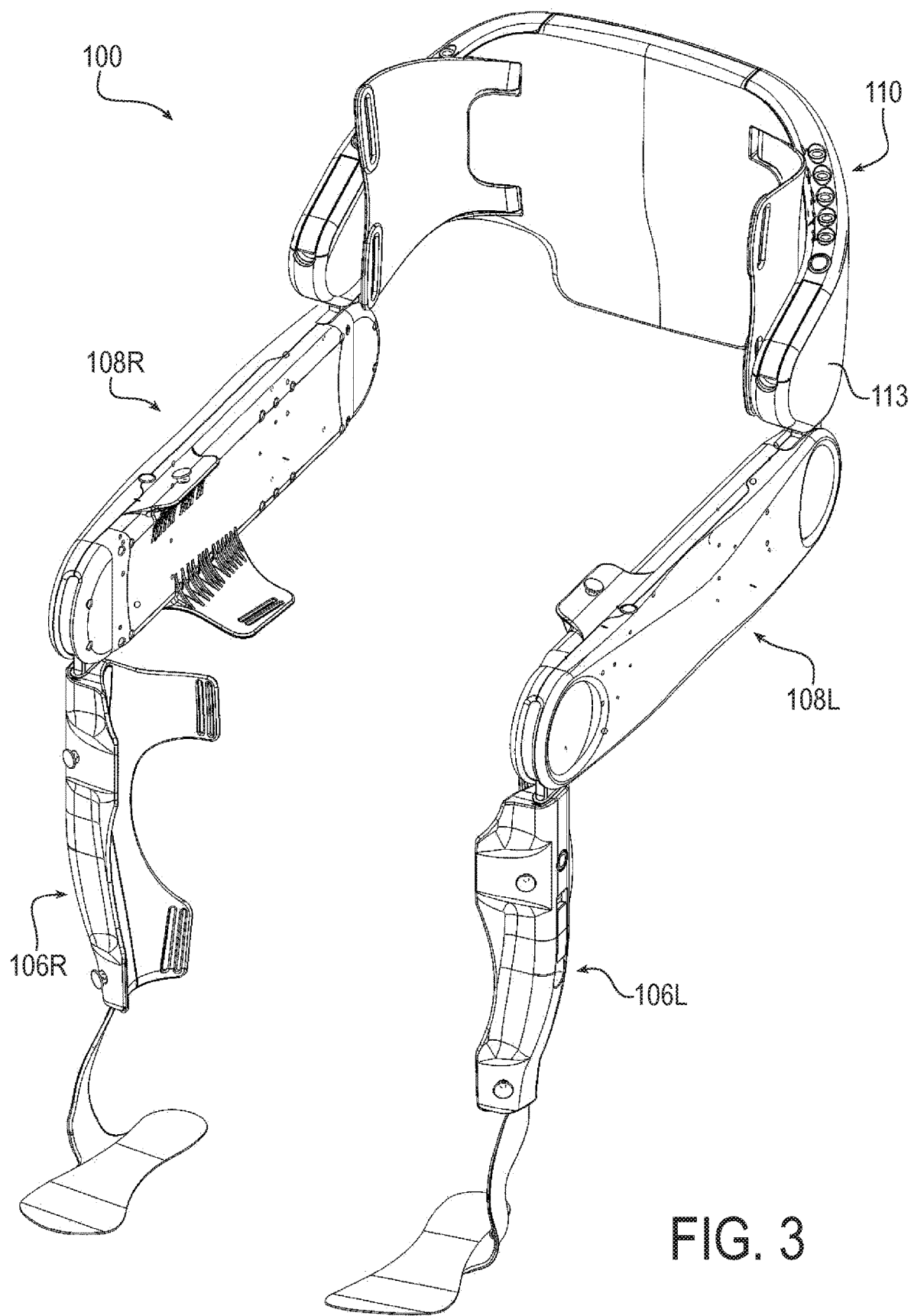
FIG. 3 is a drawing depicting a perspective view of the exemplary exoskeleton device in a seated position.
Figure 4:
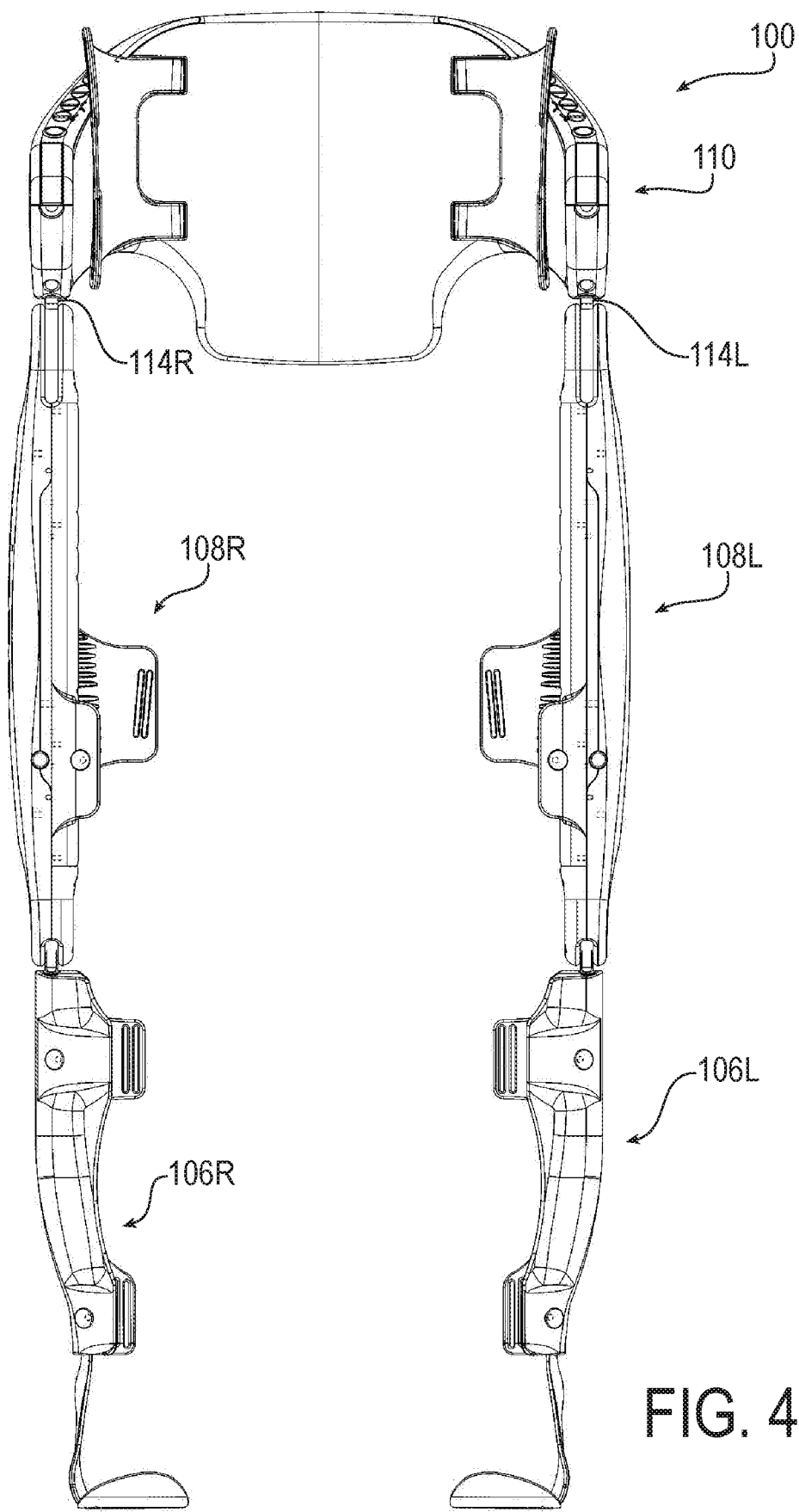
FIG. 4 is a drawing depicting a front view of the exemplary exoskeleton device in a standing position.
Figure 5:
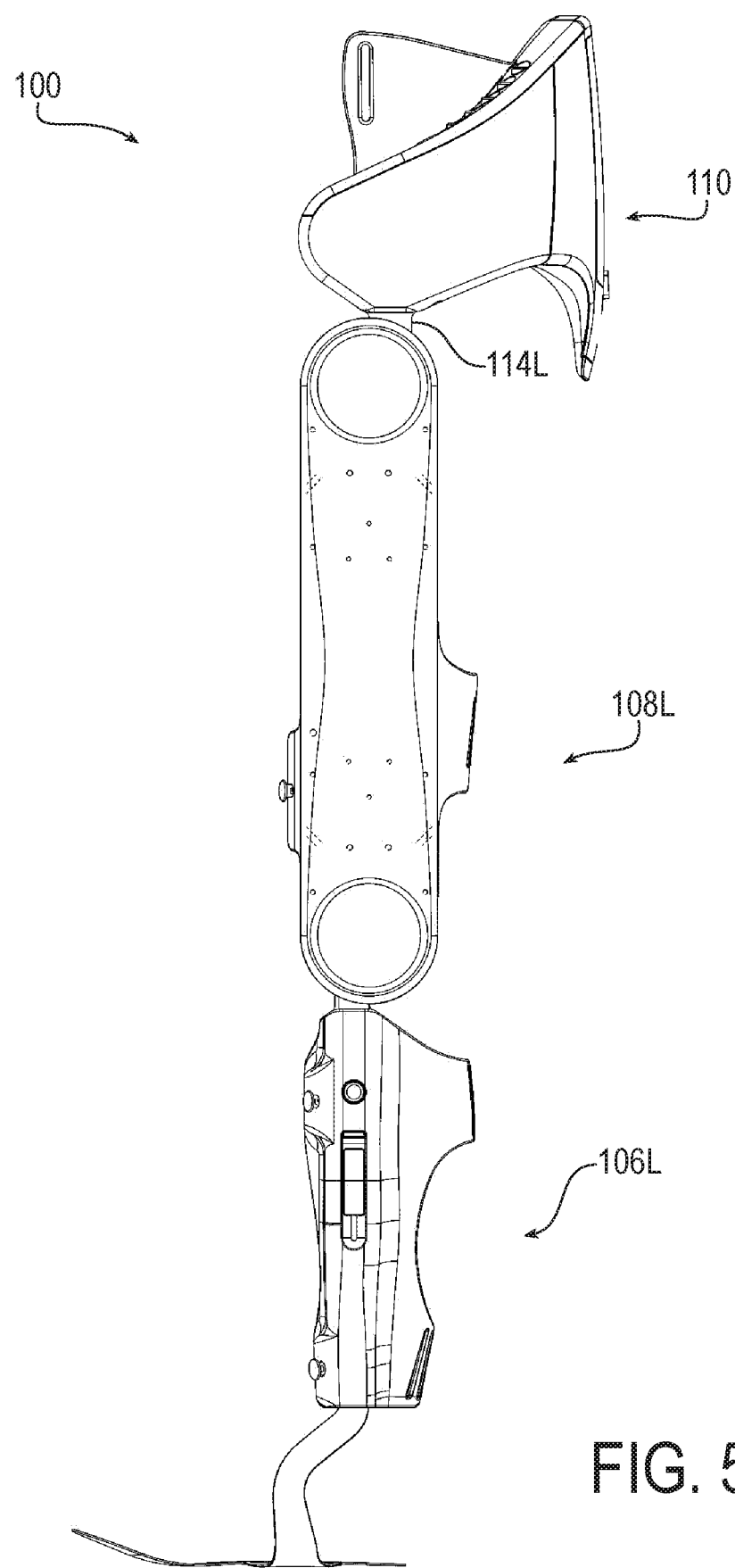
FIG. 5 is a drawing depicting a side view of the exemplary exoskeleton device in a standing position.
Figure 6:
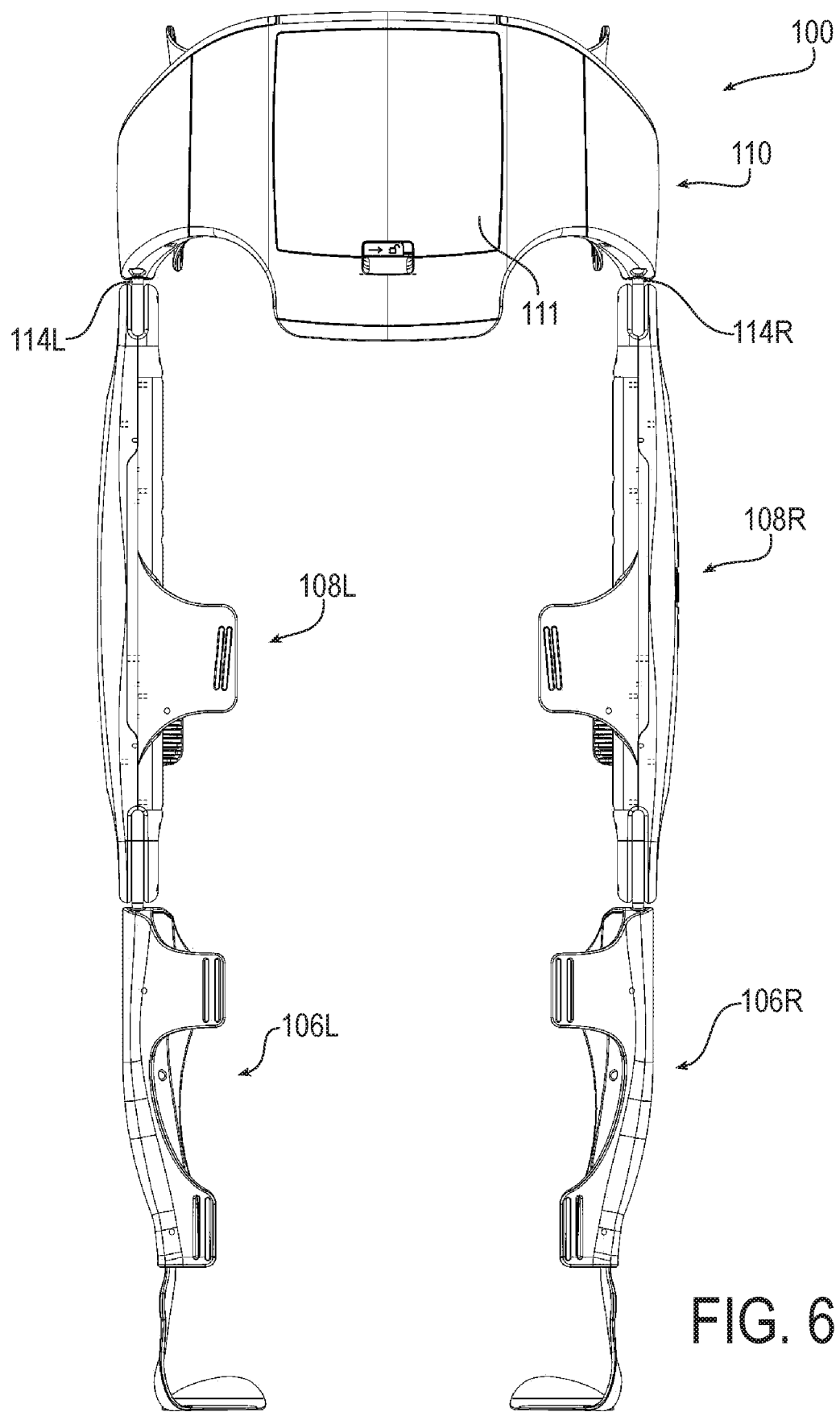
FIG. 6 is a drawing depicting a back view of the exemplary exoskeleton device in a standing position.
Figure 7:
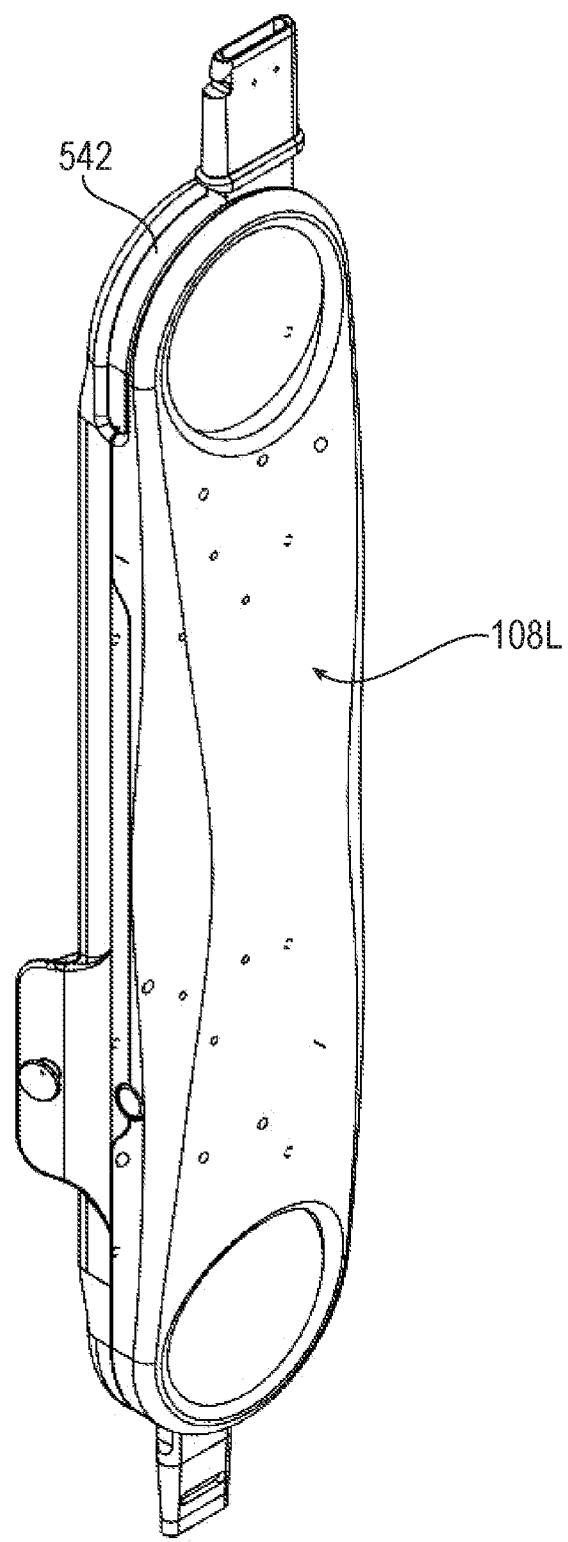
FIG. 7 is a drawing depicting a perspective view of an exemplary thigh assembly having two exemplary actuator cassettes installed therein.
Figure 8:
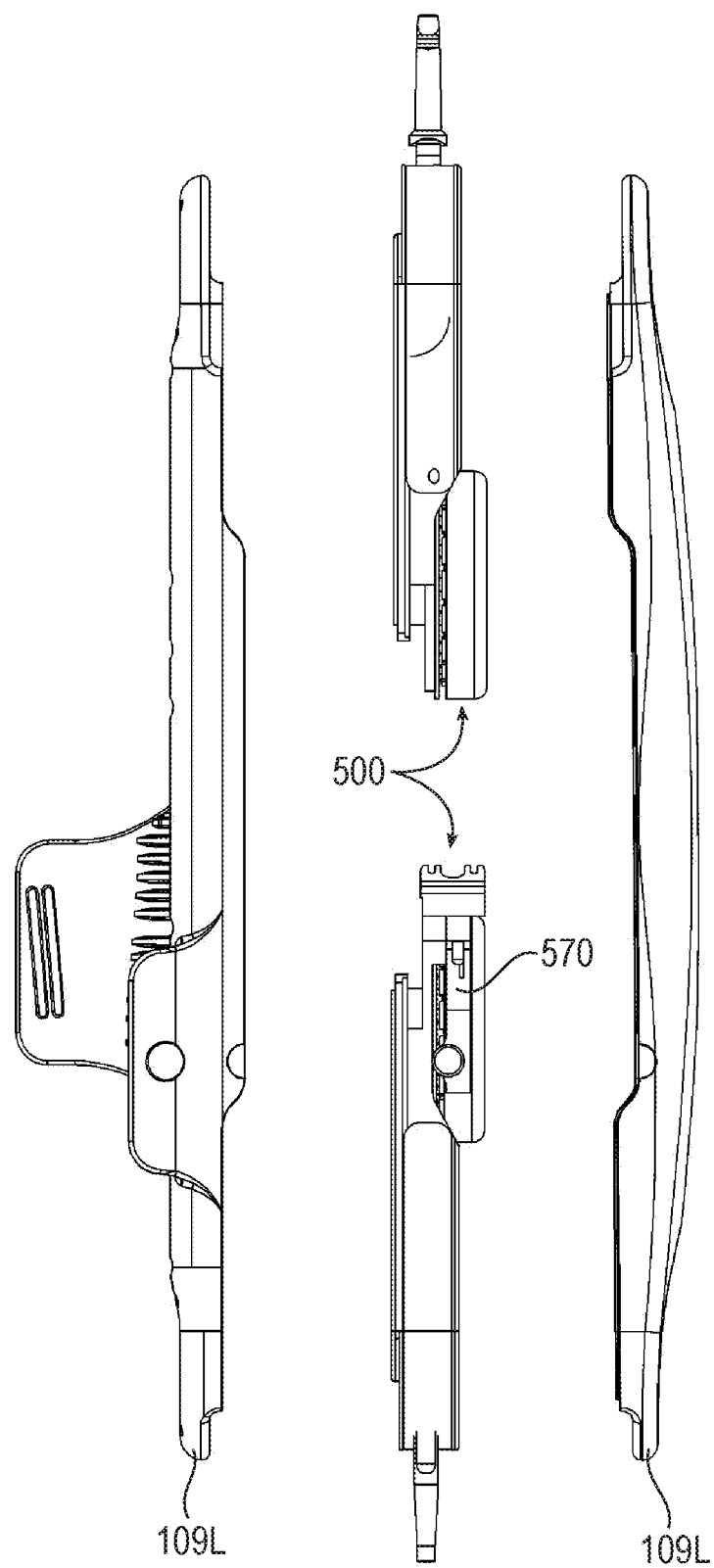
FIG. 8 is a drawing depicting a front exploded view of the exemplary thigh assembly having two exemplary actuator cassettes installed therein.
Figure 9:
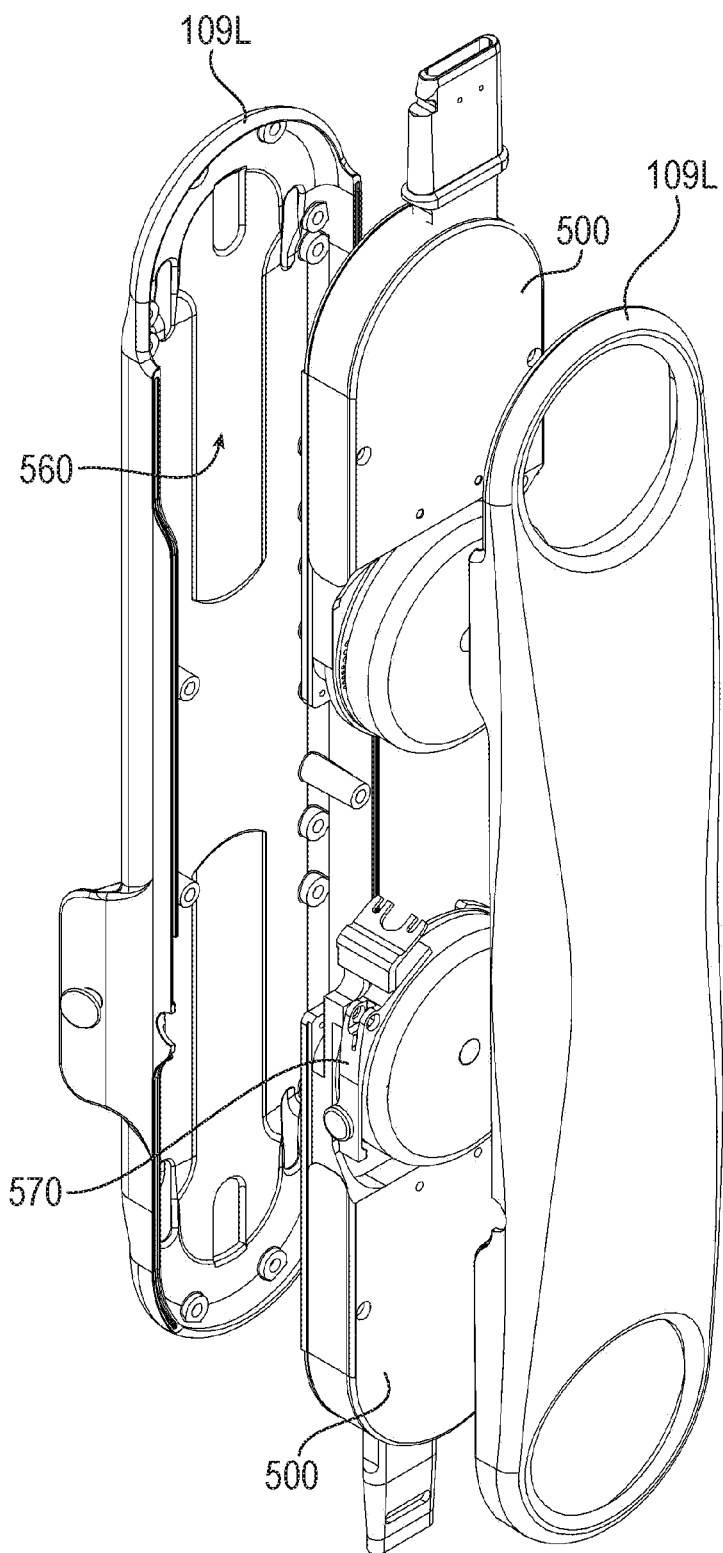
FIG. 9 is a drawing depicting a perspective exploded view of the exemplary thigh assembly having two exemplary actuator cassettes installed therein.
Figure 10:
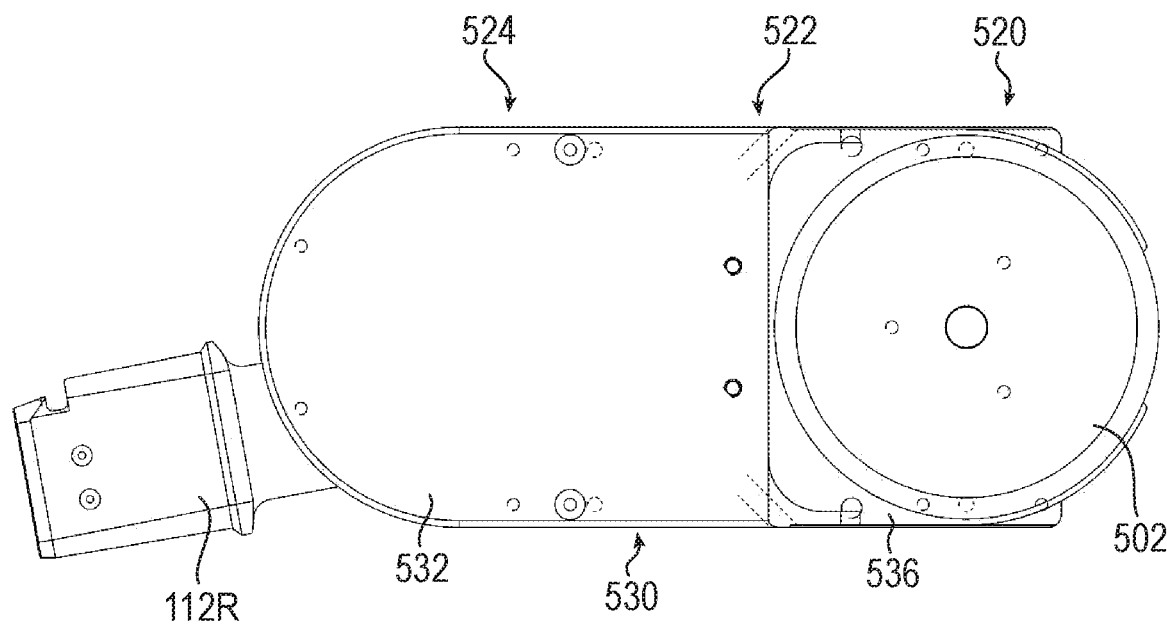
FIG. 10 is a drawing depicting a top view of an exemplary actuator cassette.
Figure 11:
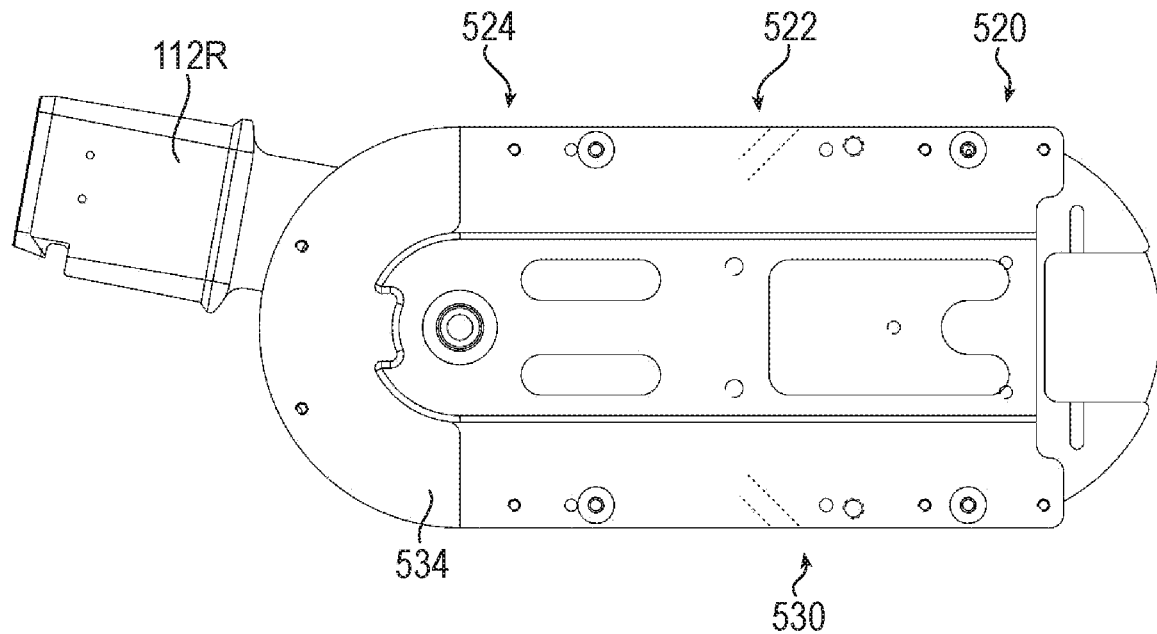
FIG. 11 is a drawing depicting a bottom view of an exemplary actuator cassette.

An exemplary legged mobility exoskeleton device is illustrated as a powered lower limb orthosis 100 in FIGS. 2-6. Specifically, the orthosis 100 shown in FIGS. 2-6 may incorporate four drive components configured as electromotive devices (for example, electric motors), which impose sagittal plane torques at each knee and hip joint components including (right and left) hip joint components 102R, 102L and knee joint components 104R, 104L. FIG. 2 shows the orthosis 100 in a standing position while FIG. 3 shows the orthosis 100 in a seated position.

As seen in the figures, the orthosis contains five assemblies or modules, although one or more of these modules may be omitted and further modules may be added (for example, arm modules), which are: two lower (right and left) leg assemblies (modules) 106R and 106L, two (left and right) thigh assemblies 108R and 108L, and one hip assembly 110. Each thigh assembly 108R and 108L includes a respective thigh assembly housing 109R and 109L, and link, connector, or coupler 112R and 112L extending from each of the knee joints 104R and 104L and configured for moving in accordance with the operation of the knee joints 104R and 104L to provide sagittal plane torque at the knee joints 104R and 104L.

The connectors 112R and 112L further may be configured for releasably mechanically coupling each of thigh assembly 108R and 108L to respective ones of the lower leg assemblies 106R and 106L. Furthermore, each thigh assembly 108R and 108L also includes a link, connector, or coupler 114R and 114L, respectively, extending from each of the hip joint components 102R and 102L and moving in accordance with the operation of the hip joint components 102R and 102L to provide sagittal plane torque at the knee joint components 104R and 104L. The connectors 114R and 114L further may be configured for releasably mechanically coupling each of thigh assemblies 108R and 108L to the hip assembly 110.

In some embodiments, the various components of device 100 can be dimensioned for the user. However, in other embodiments the components can be configured to accommodate a variety of users. For example, in some embodiments one or more extension elements can be disposed between the lower leg assemblies 106R and 106L and the thigh assemblies 108R and 108L to accommodate users with longer limbs. In other configurations, the lengths of the two lower leg assemblies 106R and 106L, two thigh assemblies 108R and 108L, and one hip assembly 110 can be adjustable. That is, thigh assembly housings 109R, 109L, the lower leg assembly housings 107R and 107L for the lower leg assemblies 106R, 106L, respectively, and the hip assembly housing 113 for the hip assembly 110 can be configured to allow the user or medical professional to adjust the length of these components in the field. For example, these components can include slidable or movable sections that can be held in one or more positions using screws, clips, or any other types of fasteners. In view of the foregoing, the two lower leg assemblies 106R and 106L, two thigh assemblies 108R and 108L, and one hip assembly 110 can form a modular system allowing for one or more of the components of the orthosis 100 to be selectively replaced and for allowing an orthosis to be created for a user without requiring customized components. Such modularity can also greatly facilitate the procedure for donning and doffing the device.

In orthosis 100, each thigh assembly housing 109R, 109L may include substantially all the drive components for operating and driving corresponding ones of the knee joint components 104R, 104L and the hip joint components 102R, 102L. In particular, each of thigh assembly housings 109R, 109L may include drive components configured as two motive devices (e.g., electric motors) which are used to drive the hip and knee joint component articulations. However, the various embodiments are not limited in this regard, and some drive components can be located in the hip assembly 110 and/or the lower leg assemblies 106R, 106L.

A battery 111 for providing power to the orthosis can be located within hip assembly housing 113 and connectors 114R and 114L can also provide means for connecting the battery 111 to any drive components within either of thigh assemblies 108R and 108L. For example, the connectors 114R and 114L can include wires, contacts, or any other types of electrical elements for electrically connecting battery 111 to electrically powered components in thigh assemblies 108R and 108L. In the various embodiments, the placement of battery 111 is not limited to being within hip assembly housing 113. Rather, the battery can be one or more batteries located within any of the assemblies of orthosis 100.

The referenced drive components may incorporate suitable sensors and related internal electronic controller or control devices for use in control of the exoskeleton device. Such internal control devices may perform using the sensory information the detection of postural cues, by which the internal control device will automatically cause the exoskeleton device to enter generalized modes of operation, such as sitting, standing, walking, variable assist operation, and transitions between these generalized modes or states (e.g., Sit to Stand, Stand to Walk, Walk to Stand, Stand to Sit, etc.) and step transition (e.g., Right Step, Left Step).

In the various embodiments, to maintain a low weight for orthosis and a reduced profile for the various components, the drive components may include a substantially planar drive system that is used to drive the hip and knee articulations of the joint components. For example, each motor can respectively drive an associated joint component through operation of an actuator containing a multi-stage speed-reduction transmission using an arrangement of reduction stages oriented substantially parallel to the plane of sagittal motion. Referring to FIGS. 7-11, consolidating the moveable parts into self-contained units, referred to herein as "cassettes," allow for ease of maintenance and replacement because cassettes are swappable, making them easier to service or requiring less of a variety in spare components. As used herein, "self-contained" means that the cassette includes everything necessary to operate in a fully functional manner if supplied with power, including receiving or generating as warranted any related control signals to the joint components. Thus, for example, if power is supplied to electrical contacts of the cassette, the cassette would actuate.

In the illustrated embodiments of the drive components, an exemplary actuator assembly includes a motor that is integrated onto a common baseplate along with the speed reduction stages of the transmission. The actuator assembly provides smooth and efficient transfer of motion from the motor to the joint angle. Integrating the motor into the cassette allows for a thinner overall package configuration and provides consistent alignment among parts. Moreover, integrating the motor into a cassette also creates a larger surface area to transfer and emit heat generated by the motor. In the instance of a mobility assistance device, these cassettes may pertain to a specific joint or set of joints on the device. Each may have a unique actuation unit or share an actuation unit. The cassettes may also house the electronic control device, and further may contain sensor elements such as the accelerometers, gyroscopes, inertial measurement, and other sensors to detect and observe the upper leg orientation or angle and angular velocity. The self-contained cassette units can be preassembled to aid in manufacturing the broader device. This allows for quick servicing of the device since individual cassettes can be swapped out and serviced.

Therefore, referring to FIGS. 7-11, a removable, self-contained, ovular actuator cassette 500 may be receivable in a receptacle of a wearable robotic device, such as for example in a left thigh component 108L. It will be appreciated that a comparable cassette design may be incorporated into any of the joint components of the device. The cassette 500 may include a first circular portion 520 housing a motive device (e.g., an electric motor) 502. A second circular portion 522 may be longitudinally offset and longitudinally overlapping the first circular portion and may house a transmission system, described in detail below, driven by the motive device 502. A third circular portion 524 may be longitudinally offset from the first and second circular portions and longitudinally overlapping the second circular portion and may house a second portion of the transmission. These three overlapping circular portions make an ovular shape, which may include the referenced sensors and electronic control devices. Therefore, an ovular housing 530 may support the motive device 502 and the multi-stage transmission system described below. Long sides of the ovular housing are straight and parallel with each other and tangentially terminate as curved end surfaces of the ovular housing.

Figure 12:
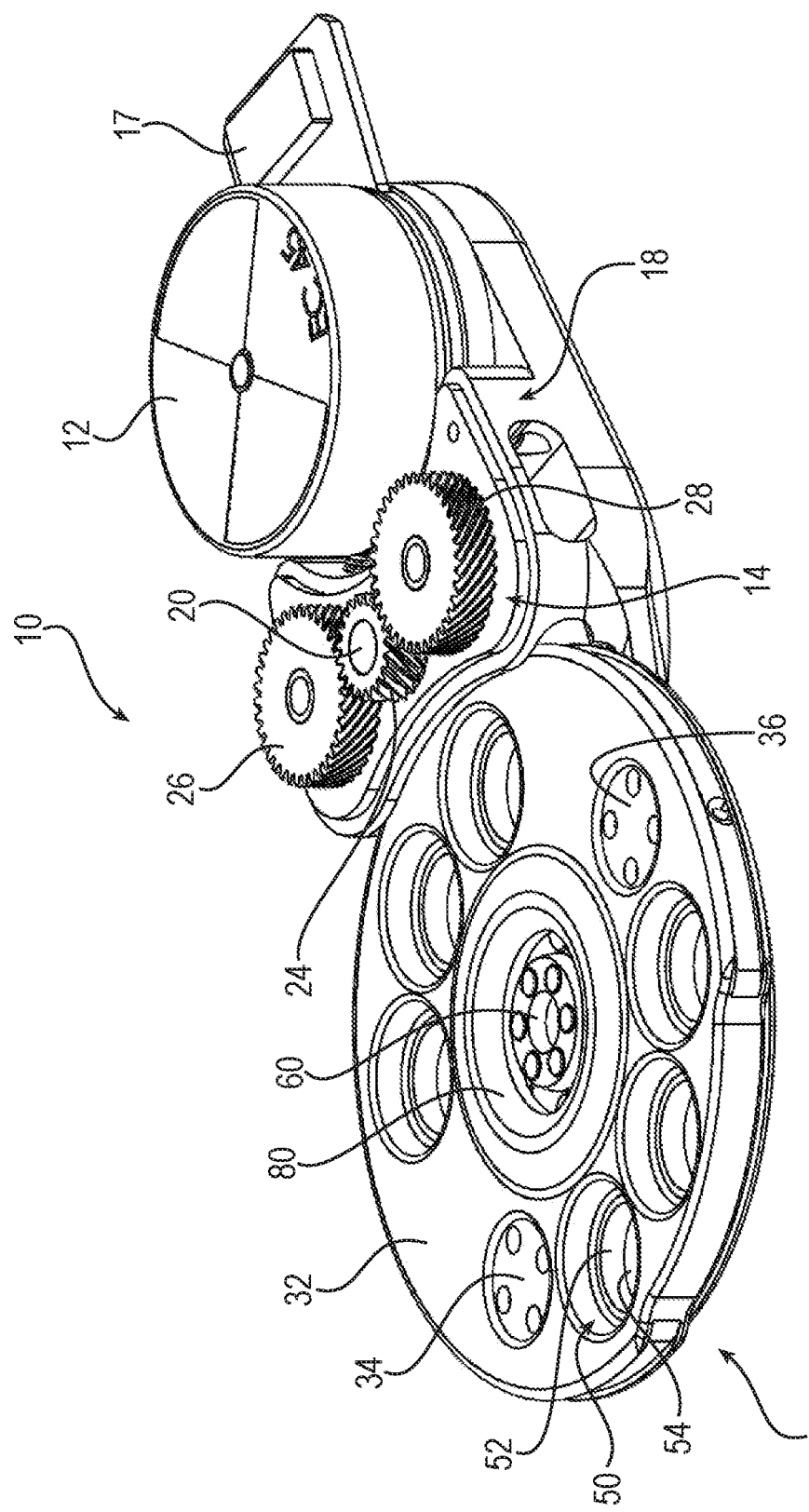
FIG. 12 is a drawing depicting an isometric view of an exemplary joint actuator assembly in accordance with embodiments of the present invention.
Figure 13:
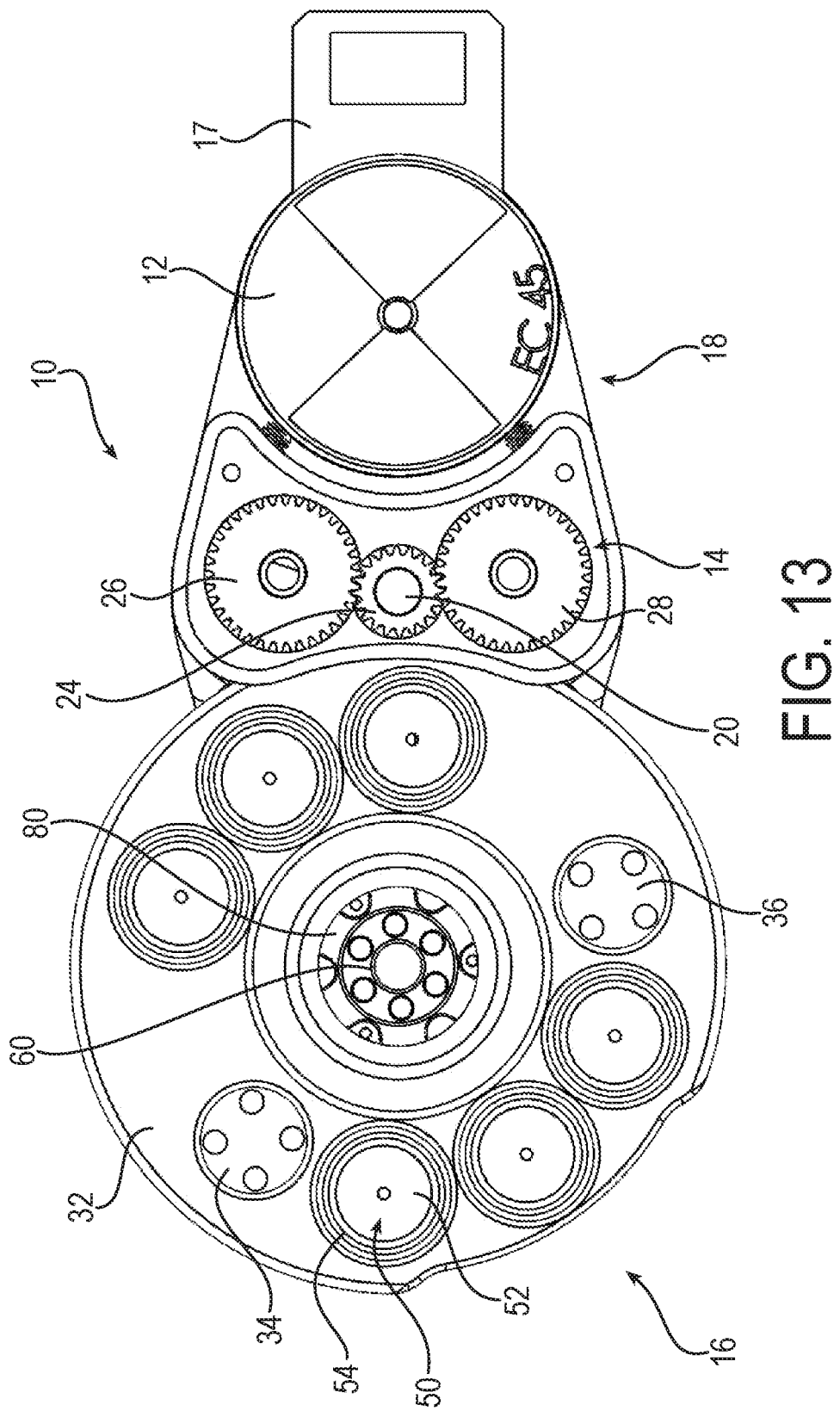
FIG. 13 is a drawing depicting a top view of the exemplary actuator assembly of FIG. 12.

FIGS. 12-13 depict two different views of an exemplary actuator assembly 10 in accordance with embodiments of the present invention. The actuator assembly 10 may be incorporated into a cassette configuration as described above. One actuator assembly 10 in a cassette may be employed for a knee joint, and another actuator assembly in a cassette may be employed for a hip joint. Such a configuration may be employed on both left and rights sides for a legged mobility exoskeleton device.

In general, in exemplary embodiments a joint actuator assembly may include a motor that drives a joint connector for driving a joint of a mobility device; a first stage of speed reduction connected to an output shaft of the motor for providing a speed reduction of the motor output; a second stage of speed reduction linked to an output of the first stage of speed reduction for providing a speed reduction relative to the output of the first stage; and a third stage of speed reduction linked to an output of the second stage of speed reduction for providing a speed reduction relative to the output of the second stage. The first, second, and third stages operate as a three-stage transmission to provide the output that drives the driven joint component.

Referring to the particular figures, FIG. 12 is a drawing depicting an isometric view of the exemplary joint actuator assembly 10 in accordance with embodiments of the present invention. FIG. 13 is a drawing depicting a top view of the exemplary actuator assembly 10 of FIG. 12. The actuator assembly 10 may be configured as a high torque-to-weight ratio actuator having a three-stage transmission with a cable reel, roller chain, or belt final transmission stage. Alternatively, any stage may be configured using gears for speed reduction. With such a configuration, the actuator assembly 10 operates as an actuator for driving a joint component of the mobility device via a three-stage speed reduction transmission to provide adequate output torque to drive the joint components of the legged mobility device.

Referring to the figures, the actuator assembly 10 may include a motor 12, a helical gear stage 14, and a cable reel assembly stage 16. Together, such components comprise the three-stage transmission that generates the output torque to drive the joint components of the legged mobility device. The motor 12 may be a brushless DC electric motor, and may have a flat profile that is sized and shaped for incorporation into an actuator cassette referenced above. The actuator assembly 10 may be powered via a power connector 17 that is electrically connected to an external power source. In exemplary embodiments in which the actuator assembly 10 is contained in a cassette in a thigh assembly, one actuator assembly 10 may be connected to a hip assembly to provide movement at the upper leg or hip joint. In addition, also located in the cassette an oppositely oriented actuator assembly 10 may be connected to a lower leg assembly to provide movement at the knee joint.

Additional details of the three-stage transmission system of the actuator assembly 10 are described in Applicant's U.S. provisional application filed on the same day as the current application, and entitled "LEGGED MOBILITY EXOSKELETON DEVICE WITH ENHANCED ACTUATOR MECHANISM." Such application is incorporated here by reference. The three-stage transmission system is considered a non-limiting example for illustration. Other configurations of speed reduction transmission systems may be employed, which may use the magnetic/electrical coupling system of the present invention, including a multi-stage transmission assembly having a number of stages different from three stages, such as for example a two-stage speed reduction transmission assembly.

In the example of FIGS. 12 and 13, generally a first transmission stage 18 may include the motor 12 referenced above, which through a drive mechanism drives an output shaft 20. The driving of the first stage output shaft 20 interconnects the first stage 18 of the actuator assembly 10 to the helical gear stage 14, which operates as a second stage of speed reduction. More particularly, the first stage output shaft 20 may be mechanically connected to a central gear 24. The central gear 24 may mesh with first and second outer gears 26 and 28, each located on opposite sides of the central gear 24 as shown in FIGS. 12-13. In this manner, the central gear 24 may transmit power to the first and second outer gears 26 and 28. In addition, the two outer helical gears are larger than the central helical gear to provide the second stage of speed reduction of the output of the first stage of speed reduction. These large helical gears 26 and 28 may be linked to a third final stage of speed reduction that is configured as the cable reel assembly 16, such that the output of the second stage of speed reduction transmits power to the third stage of speed reduction. Generally, the cable reel assembly 16 may include an output reel 32 and at least one cable element (not shown) that interconnects the output of the second stage of speed reduction and the output reel. The output of the second stage of speed reduction thus transmits power to the output reel 32. Multiple cable elements may be provided that spool around first and second cable reels 34 and 36, such that the cable reels operate oppositely to draw in or pay out cable to drive rotation of the output reel 32. The third speed reduction is achieved due to the larger size of the output reel 32 relative to the cable reel path around the outer helical gear 26 and 28, as shown in FIGS. 12 and 13. As referenced above, details of the three-stage transmission system of the actuator assembly 10, which is a non-limiting example, are describe in Applicant's other provisional application filed on the same day as the current application, and which is incorporated here by reference.

Referring again to FIGS. 12 and 13, the output reel 32 may include a plurality of recessed pockets 50 that can provide for magnetic coupling of the actuator assembly 10 to a driven component that is driven by rotation of the output reel 32. In the example of FIGS. 12 and 13, the output reel 32 includes six such recessed pockets 50 spaced equidistantly around the output reel as an exemplary embodiment, although any suitable number of recessed pockets may be employed. In this embodiment, each recessed pocket 50 may include a magnetic element 52 located at the bottom of the recess pocket (i.e., there are six magnetic elements in this embodiment) that is used for magnetic coupling to a driven component. Each recessed pocket further may include a mating surface 54 to aid in magnetic coupling to a cooperating mating surface of the driven component. The magnetic coupling system is described in detail in another separate provisional patent application being filed contemporaneously herewith, entitled "LEGGED MOBILITY EXOSKELETON DEVICE WITH ENHANCED ACTUATOR MECHANISM EMPLOYING MAGNETIC COUPLING," which also is incorporated here by reference.

Aspects of the present invention pertain to an additional magnetic/electrical coupling system that further operates to aid in coupling the actuator assembly 10 to a driven component. Generally, in exemplary embodiments a joint actuator assembly incudes a motor, a rotating driving member driven by the motor for driving a driven component, and a transmission assembly located between the motor and the rotating driving member that provides speed reduction from the motor to the rotating driving member. The rotating driving member includes a magnetic/electrical coupling comprising at least one magnetic coupling component configured to magnetically couple with an opposing magnetic coupling of the driven component, and an electrical element configured to provide an electrical connection to an opposing electrical element of the driven component.

The magnetic/electrical coupling system provides an electrical connection between the actuator assembly and the driven component for power transmission and signal transmission, when such components are coupled or joined together mechanically. The present invention provides an easy-to-use, robust magnetic/electrical coupling that provides an electrical connection using magnetic coupling, which is self-aligning, self-drawing, and performs well for both power transmission and signal transmission. On the actuator assembly side, the magnetic/electrical coupling system may include a first magnetic/electrical quick coupling 60 located on the actuator assembly 10, as identified in FIGS. 12 and 13. The first magnetic/electrical coupling 60 is configured to couple to a cooperating second magnetic/electrical coupling on the driven component, which is described below. Magnetic forces between the two couplings aid in joining the actuator assembly and driven component together, and upon such joining an electrical connection also is established between the actuator assembly and the driven component.

Generally, in exemplary embodiments, the magnetic/electrical coupling system of the present invention provides for a self-aligning, self-drawing magnetic/electrical connector configured as a two-part coupling system with a magnetic receptacle located in a rotational center of the driven component, and the magnetic/electrical quick coupling 60 on the actuator assembly 10. The magnetic/electrical quick coupling 60 may be configured as a ferrous plug 60 located in a rotational center of a rotating driving member (e.g., output reel) 32 of the actuator assembly 10.

Figure 14:
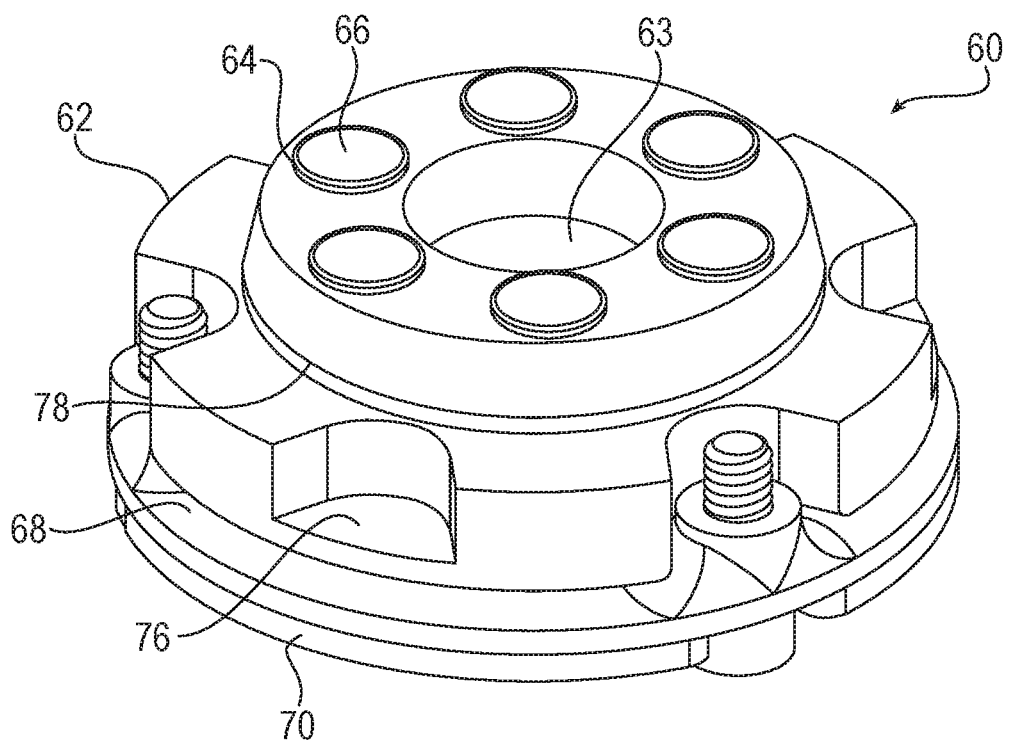
FIG. 14 is a drawing depicting an isometric view of an exemplary first magnetic/electrical coupling configured as a ferrous plug in accordance with embodiments of the present invention.
Figure 15:
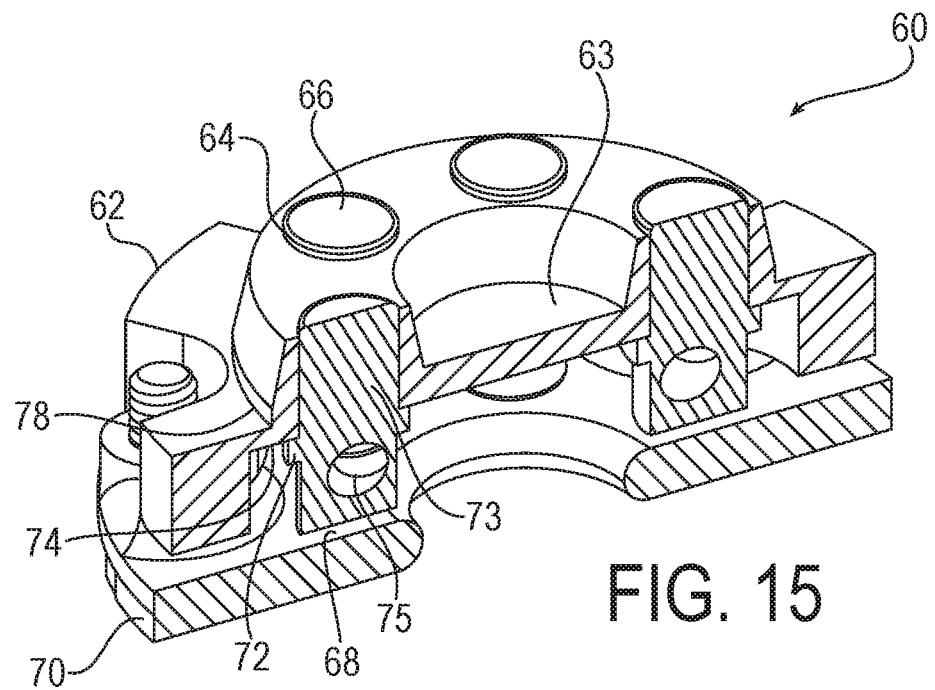
FIG. 15 is a drawing depicting an isometric and cross-sectional view of the exemplary ferrous plug of FIG. 14.

FIG. 14 is a drawing depicting an isometric view of an exemplary first magnetic/electrical coupling 60 on the actuator assembly side configured as a ferrous plug in accordance with embodiments of the present invention. FIG. 15 is a drawing depicting an isometric and cross-sectional view of the exemplary ferrous plug 60 of FIG. 14. The ferrous plug 60 of the rotating driving member may include a plug housing 62, which may be configured as a non-conductive cylindrical housing that houses at least one magnetic coupling component. For example, the ferrous plug housing may be made of a suitable non-conductive rigid plastic. The housing may include a pattern of a plurality of radially spaced through-holes 64 that each respectively houses one of the magnetic coupling components.

In exemplary embodiments, each magnetic coupling component may be configured as a ferrous contact 66 made of a ferrous material (i.e., not itself a magnet), such as any suitable ferrous metal. Accordingly, the through-holes 64 of the plug housing 62 each may include a ferrous contact 66 installed into each through-hole 64. The ferrous contacts 66 may be plated with a conductive metal that is in electrical contact with the electrical element, and in exemplary embodiments the conductive metal is nickel, although any suitable conductive metal may be employed. In the example of FIGS. 13 and 14, the ferrous plug 60 includes six through-holes respectively containing six ferrous contacts, although any suitable number may be employed as appropriate to provide the necessary electrical connection. The ferrous plug housing further may define a central recess 63 that is configured to receive a protrusion on a second magnetic/electrical coupling located on the driven component, as further described below.

FIG. 16 depicts an isometric view of an exemplary ferrous contact 66 in isolation, which may be employed in the ferrous plug 60 of FIGS. 14 and 15 in accordance with embodiments of the present invention. In exemplary embodiments, the ferrous contact includes a central body and a shoulder that extends from the central body, and the shoulder interacts against a bottom surface of the housing. Referring to FIGS. 15 and 16 in particular, the ferrous contacts 66 may be designed to be undersized relative to a diameter of the ferrous plug through-holes such that the ferrous contact floats within the respective through-hole. Each ferrous contact 66 further may include a shoulder 72 that interacts against a bottom surface 74 of the plug housing 62. The shoulders 72 may extend radially from a central cylindrical body 73 of the ferrous contact 66. This configuration including the shoulder allows the ferrous contacts to float within axial limits in the ferrous plug housing, ensuring that full contact can be made with respective opposing electrical and magnetic elements on the driven component side.

The magnetic/electrical coupling also may include a base portion that is attached to the rotational driving member, and there is a clearance between the base portion and the non-conductive housing such that the magnetic/electrical coupling floats within the rotational driving member. Referring to the figures, there may be a bottom clearance 68 between a base portion 70 that is attached to the output reel and the ferrous contact 66 of the ferrous plug 60. The base portion 70 may be a rigid washer or comparable structure.

Electrical wires for power and signal transmission are soldered directly to a backside of each ferrous contact 66, which establishes an electrical connection between the cooperating coupling component on the driven component and the ferrous plug 66 on the actuator assembly 10 when the two components are mechanically joined together. For effective placement of electrical wiring, each ferrous contact 66 may include a contact through-hole 75 for placement of the electrical element, such as the electrical wiring. The contact through-holes 75 may secure the wire insulation for the electrical elements, and can provide strain relief at the solder joint where the electrical wiring is soldered to the ferrous contact.

The ferrous plug housing 62 may include an outer diameter surface including surface keying features for mechanical keying of the magnetic/electrical coupling within the rotating driving member of the actuator assembly. In exemplary embodiments, the surface keying features may be configured as recesses 76 and shoulder element 78 that may be mechanically keyed to matched keying features present in a bore 80 (see FIGS. 12 and 13) defined by the actuator output reel 32. The keying features 76 and 78 may be undersized on the ferrous plug housing relative to the output reel bore to allow for the entire ferrous plug 60 to float slightly within the output reel 32. The shoulder element 78 on the ferrous plug housing limits forward axial travel, and the base portion 70 may be configured as a snap ring and non-conductive washer that may be installed below the ferrous plug housing 62 to limit backward axial travel of both the ferrous plug housing, as well as the ferrous contacts within the ferrous plug housing as referenced above.

Generally, the actuator and the driven component may be combined into a mobility device including a magnetic/electrical coupling system comprising a first magnetic/electrical coupling on the actuator assembly that magnetically and electrically couples to a second magnetic/electrical coupling on the driven component. The magnetic/electrical coupling system includes a plurality of magnetic elements located as part of one or both of the first and/or second magnetic/electrical couplings. The first magnetic/electrical coupling includes an electrical element configured to provide an electrical connection to an opposing electrical element of the second magnetic/electrical coupling when the actuator assembly and the driven component are joined together.

Figure 18:
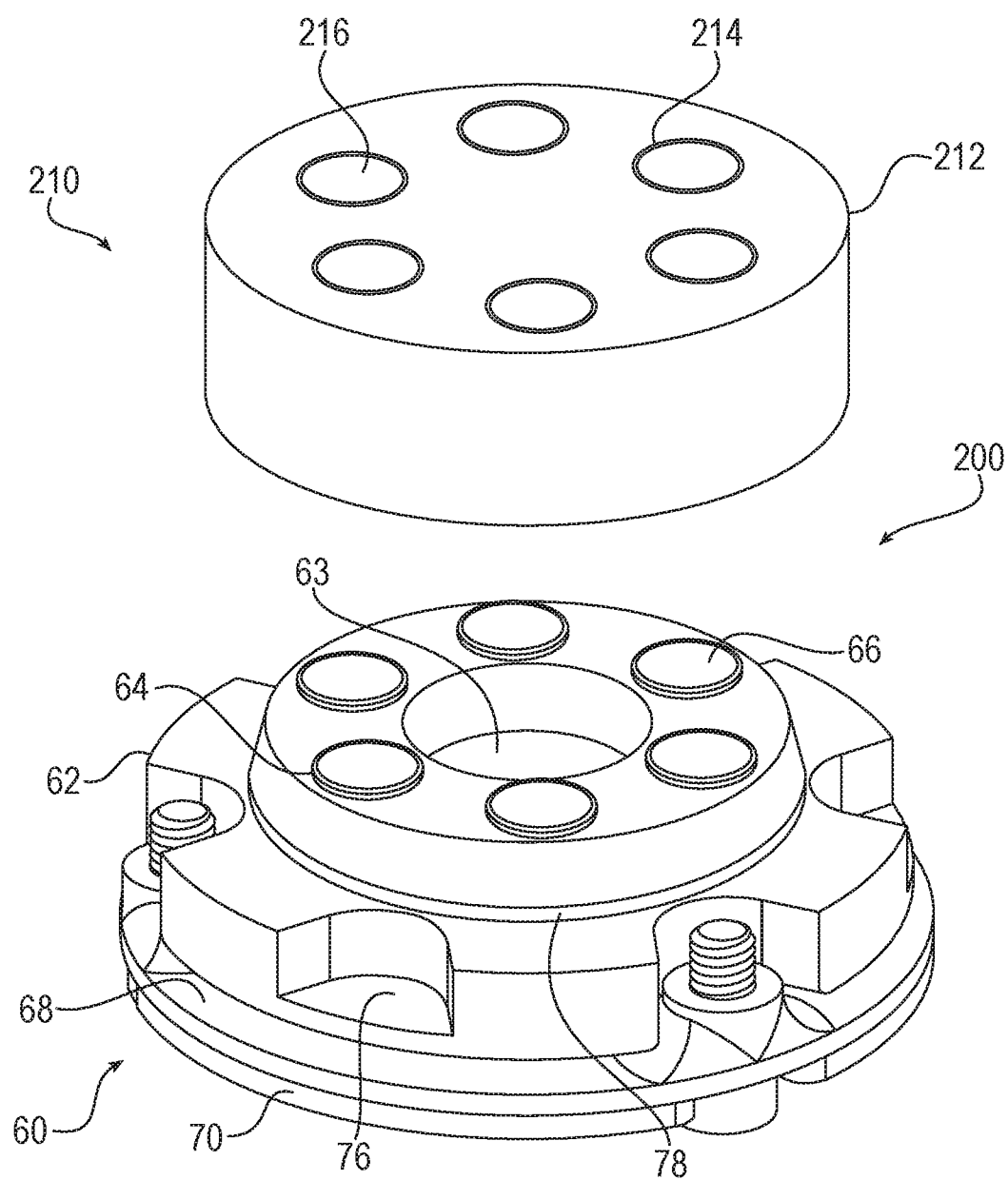
FIG. 18 is a schematic drawing depicting an isometric view of the exemplary magnetic/electrical coupling system of FIG. 17, with the magnetic receptacle being shown from a top viewpoint.

The first magnetic/electrical coupling on the actuator assembly is described above with reference to FIGS. 12-14 as the first magnetic/electrical coupling or ferrous plug 60. As detailed above, the first magnetic/electrical coupling includes a non-conductive housing that houses the ferrous contacts plated with a conductive metal that is in electrical contact with the electrical element to provide the electrical connection. FIG. 17 is a schematic drawing depicting an isometric view of an exemplary magnetic/electrical coupling system 200 in accordance with embodiments of the present invention, including the ferrous plug 60 of FIGS. 14 and 15 in combination a second magnetic/electrical coupling 210 of a driven component. The second magnetic/electrical coupling 210 may be configured as a magnetic receptacle 210 on the driven component, the magnetic receptacle being shown from a bottom viewpoint. FIG. 18 is a schematic drawing depicting an isometric view of the exemplary magnetic/electrical coupling system 200 of FIG. 17, with the second magnetic/electrical coupling or magnetic receptacle 210 being shown from a top viewpoint.

The magnetic receptacle 210 may include a non-conductive housing 212 that houses a plurality of magnetic elements, and is configured to connect to the ferrous plug 60. The ferrous coupling components on the ferrous plug 60 respectively and magnetically couple with the magnetic elements on the magnetic receptacle 210 when the actuator assembly and the driven component are joined together. The magnetic receptacle housing 212, similarly to the ferrous plug housing 62, may be configured as a cylindrical housing made of a suitable non-conductive rigid plastic. The magnetic receptacle housing 212 may include multiple radially spaced through-holes 214 that each respectively receives one of the magnetic elements. The through-holes 214 may be arranged in a pattern that matches the pattern of the through-holes 64 in the ferrous plug housing 52. Accordingly, in the depicted example having six through-holes 64 in the ferrous plug housing, a matching pattern of six through-holes 214 are provided in the magnetic receptacle housing, although again any suitable number may be employed.

The through-holes 214 of the magnetic receptacle housing 212 each may include a magnetic element 216 installed into each through-hole 214 and plated with a conductive metal. In exemplary embodiments, the magnetic elements 216 each may be a neodymium magnetic element, each plated with a conductive layer of nickel similarly as the ferrous contacts 66, although any suitable conductive metal plating may be employed. The magnetic elements 216 may be permanently installed in the through-holes of the magnetic receptacle housing 212, and electrical elements (e.g., electrical wires) for power and signal transmission may be soldered directly to a backside of each magnetic element. Thus, a wire harness is formed with the magnetic receptacle 210 serving as a final electrical terminal on one end, and accordingly the magnetic receptacle 210 also is referred to herein as a terminal receptacle 210. The terminal receptacle may be affixed to the driven component (e.g., the hip brace or a limb component of an exoskeleton device) in the center of rotation of the joint component. The magnetic elements of the second magnetic/electrical coupling (magnetic receptacle 210) are connected to the opposing electrical elements for electrical connection with the electrical elements on the first magnetic/electrical coupling. To aid in aligning the terminal receptacle 210 to the ferrous plug 62, the terminal receptacle housing 212 may include a central protrusion 213 that is received within central recess 63 in the ferrous plug housing when the two components of the coupling system 200 are joined together.

The magnetic/electrical coupling system operates as follows. Magnetic coupling draws the driven component into mechanical connection with the rotating driving member (output reel) of actuator assembly. This initial coupling may occur in part using the magnetic coupling via the recessed pockets 50 and related magnetic coupling component described in the related magnetic coupling application. As the two components are drawn together, the magnetic terminal receptacle 210 draws the ferrous plug 60 into a coupled state via the magnetic attractive force between the ferrous contacts 66 and the magnetic elements 216. As referenced above, electrical wiring is soldered to the backsides of both the ferrous contacts 66 and the magnetic elements 216. Accordingly, as a result of the joining of the ferrous contacts 66 and the magnetic elements 216, an electrical connection via the opposing electrical elements or wiring is achieved. In this manner, each magnetic coupling of the terminal receptacle 210 and the ferrous plug 60 serves both to draw the components together into a mechanical connection, and also establishes an electrical connection itself when the mechanical connection is made. The electrical connection may provide for both power transmission and signal transmission between the joined components.

In an exemplary embodiment of six magnetic elements 216 in the terminal receptacle 210, each of the six magnetic elements may provide 1.5 pounds of holding force with an opposing ferrous contact 66 in the ferrous plug 60, for a total holding force of 9 pounds. This 9 pounds of holding force acts to prevent the electrical connection from separating and being lost during use of the mobility device. In testing, the resultant electrical connection has exhibited minimal resistive losses across the power transmission contacts, and excellent signal integrity across the signal contacts when transmitting a 2 MHz square wave across the signal contacts, even during impact and vibration. The float provided in the ferrous plug further allows for a partial mechanical disengagement of the magnetic coupling system without dropping the electrical connection.

In another exemplary embodiment, the magnetic coupling components on the first magnetic/electrical coupling may include a plurality of magnetic elements rather than simply ferrous contacts. Such magnetic elements may be of opposite polarity relative to magnetic elements located on the second magnetic/electrical coupling. For example, the ferrous contacts 66 in the ferrous plug housing instead may be configured as additional magnetic elements 66 to form a magnetic plug. In one embodiment, in the first magnetic/electrical coupling polarity of the magnetic elements 66 is the same for all magnetic elements, and in the second magnetic/electrical coupling polarity is the same for all magnetic elements 216 and opposite to the polarity of the magnetic elements in the first magnetic/electrical coupling.

In another embodiment, the magnet polarity between the magnetic elements 216 in the terminal receptacle and the additional magnetic elements 66 in the magnetic plug may be alternated in a way that provides magnetic keying which disallows improper mating alignment of the driven component and the actuator assembly. This magnetic keying provides for self-aligning components. The magnetic keying may be achieved by the magnetic elements in each of the first magnetic/electrical coupling on the rotational driving member (output reel 32) and the second magnetic/electrical coupling on the driven component being installed with alternating and opposite polarity. In other words, a magnetic element 216 may be installed in the terminal receptacle with the north pole facing out; a next adjacent magnetic element 216 may be installed with the south pole facing out; and so on in alternating fashion. The magnetic plug of the actuator assembly similarly would have the additional magnetic elements 66 installed with alternating polarity, and of opposite polarity to the magnetic elements of the terminal receptacle to achieve a strong magnetic coupling. In this way, the magnetic/electrical coupling system has magnetic keying that actively forces the two components apart if the user is attempting to make the coupling in the wrong orientation or with an incorrect alignment of the terminal receptacle 210 and the magnetic embodiment of the plug 60.

In operation of a mobility device, rotation of the output reel 32 drives a driven component, such as for example an upper or lower joint component of a mobility device. Generally, the driven component may be a contoured plastic orthotic component that contours and attaches to the lower leg of a human wearer, or to a hip component that is worn about the user's torso. The coupling of the actuator assembly with the driven component thus forms a joint component at which rotational movement may be achieved to permit user movements while wearing the mobility device. The driven component may include a coupling portion having raised mating features or protrusions that essentially match the recessed pockets of the output reel of the actuator assembly. The driven component further may include the terminal receptacle 210 that couples to the ferrous plug 60 (or the magnetic plug 60 in the embodiment in which the plug includes magnetic elements).

Figure 19:
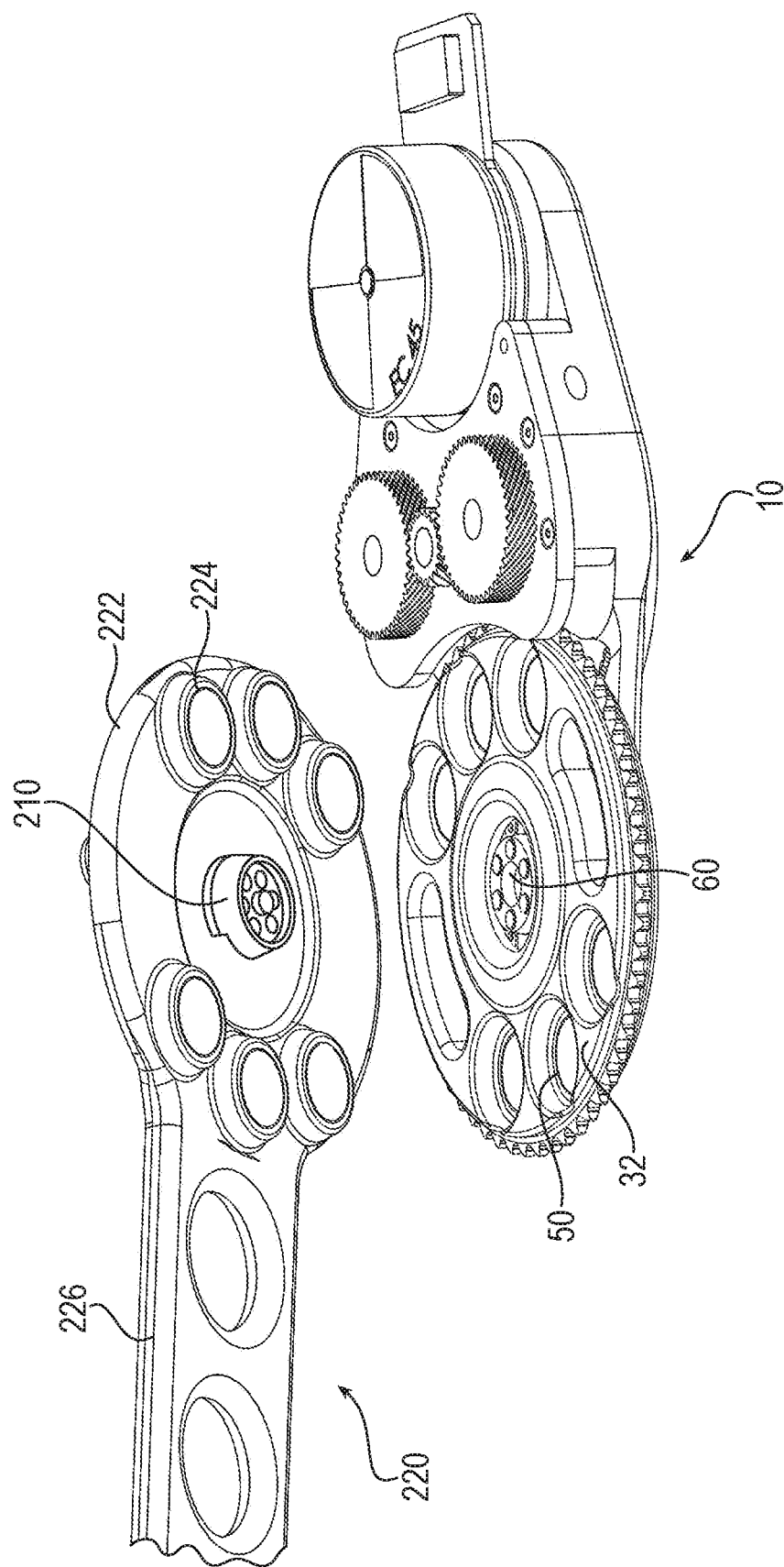
FIG. 19 is a drawing depicting an isometric view of the exemplary joint actuator assembly in combination with an exemplary driven component that includes the magnetic receptacle, in accordance with embodiments of the present invention.
Figure 20:
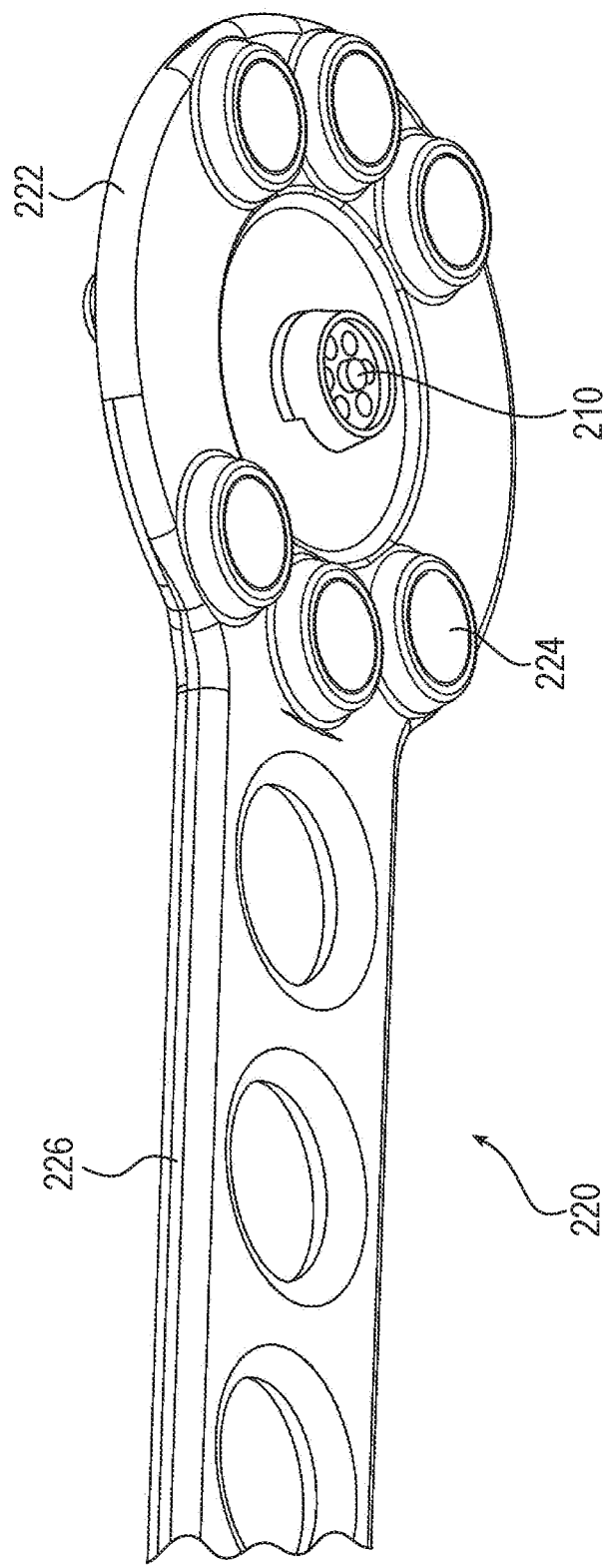
FIG. 20 is a drawing depicting an isometric view of the exemplary driven component of FIG. 19 in isolation.

In accordance with such features, FIG. 19 is a drawing depicting an isometric view of the exemplary joint actuator assembly 10 in combination with an exemplary driven component 220 that includes the terminal receptacle 210, in accordance with embodiments of the present invention. FIG. 20 is a drawing depicting an isometric view of the exemplary driven component 220 of FIG. 19 in isolation.

Generally, as referenced above the actuator assembly and the driven component may be combined into a mobility device comprising the actuator assembly including the rotating driving member, and a driven component that is driven by the rotating driving member, wherein the actuator assembly and the driven component are magnetically and electrically coupled by the magnetic/electrical coupling system including the first magnetic/electrical coupling (e.g., ferrous or magnetic plug 60) coupled to the second magnetic/electrical coupling (e.g., magnetic or terminal receptacle 210).

Referring to FIGS. 19 and 20, the driven component 220 may include a coupling portion 222 that includes a plurality of raised mating features 224. In the example of the figures, six raised mating features 224 are employed to engage with the six recessed pockets 50 of the actuator assembly for magnetic coupling, although any suitable number may be employed. As also referenced above, the driven component further may include the terminal receptacle 210 that is located in a rotational center of the driven component, and that magnetically and electrically couples to the ferrous plug 60 (or the magnetic plug 60 in the embodiment in which the plug includes magnetic element). The coupling portion 222 may be integrally attached to a body portion 226. The body portion 226 may constitute a primary component and support frame of an upper or lower limb component of the mobility device.

The joint actuator assembly generally may be incorporated into a mobility device including a joint component acting as the driven component, and the actuator assembly, wherein the actuator assembly drives the joint component. The mobility device may be any suitable powered mobility device, such as a powered orthotic device, prosthetic device, or legged mobility device.

In exemplary embodiments, the mobility device may be a legged mobility exoskeleton device comparable as the device depicted in FIGS. 1-11. Such exoskeleton device may include a hip component, at least one lower leg assembly, and at least one thigh assembly connected to the hip assembly at a hip joint and connected to the at least one lower leg assembly at a knee joint. The at least one thigh assembly may include a first actuator assembly that drives the hip joint, and a second actuator assembly that drives the knee joint. In an exemplary full exoskeleton device with left and right side components, the at least one lower leg assembly includes a left lower leg assembly and a right lower leg assembly. The at least one thigh assembly includes a left thigh assembly connected to the hip assembly at a left hip joint and to the left lower leg assembly at a left knee joint, and a right thigh assembly connected to the hip assembly at a right hip joint and to the right lower leg assembly at a right knee joint. The left thigh assembly includes a first actuator assembly that drives the left hip joint, and a second actuator assembly that drives the left knee joint. The right thigh assembly similarly includes a third actuator assembly that drives the right hip joint, and a fourth actuator assembly that drives the right knee joint.

An aspect of the invention, therefore, is a joint actuator assembly having an enhanced magnetic/electrical coupling. In exemplary embodiments, the joint actuator assembly includes a motor; a rotating driving member driven by the motor for driving a driven component; and a transmission assembly located between the motor and the rotating driving member that provides a speed reduction from the motor to the rotating driving member. The rotating driving member includes a magnetic/electrical coupling comprising at least one magnetic coupling component configured to magnetically couple with an opposing magnetic coupling of the driven component, and an electrical element configured to provide an electrical connection to an opposing electrical element of the driven component. The joint actuator assembly may include one or more of the following features, either individually or in combination.

In an exemplary embodiment of the joint actuator assembly, the magnetic/electrical coupling includes a non-conductive housing that houses the at least one magnetic coupling component.

In an exemplary embodiment of the joint actuator assembly, the non-conductive housing defines a plurality of through-holes that each respectively houses one of the at least one magnetic coupling components.

In an exemplary embodiment of the joint actuator assembly, the at least one magnetic coupling component is a ferrous contact plated with a conductive metal that is in electrical contact with the electrical element.

In an exemplary embodiment of the joint actuator assembly, the non-conductive housing defines a plurality of through-holes that each respectively houses one ferrous contact, and each ferrous contact is undersized relative to the respective through-hole of the housing such that the ferrous contact floats within the respective through-hole.

In an exemplary embodiment of the joint actuator assembly, the ferrous contact includes a central body and a shoulder that extends from the central body, and the shoulder interacts against a bottom surface of the housing.

In an exemplary embodiment of the joint actuator assembly, the central body defines a contact through-hole for placement of the electrical element.

In an exemplary embodiment of the joint actuator assembly, the non-conducive housing includes six through-holes spaced equidistantly around the housing, the six through-holes housing six respective magnetic coupling components.

In an exemplary embodiment of the joint actuator assembly, the conductive metal is nickel.

In an exemplary embodiment of the joint actuator assembly, the non-conductive housing defines a central recess that is configured to receive a protrusion on the driven component.

In an exemplary embodiment of the joint actuator assembly, the at least one magnetic coupling component includes a magnet element.

In an exemplary embodiment of the joint actuator assembly, the magnetic/electrical coupling includes a base portion that is attached to the rotational driving member, and there is a clearance between the base portion and the non-conductive housing such that the magnetic/electrical coupling floats within the rotational driving member.

In an exemplary embodiment of the joint actuator assembly, the magnetic/electrical coupling is located in a rotational center of the rotating driving member.

In an exemplary embodiment of the joint actuator assembly, an outer diameter of the non-conductive housing includes surface keying features for mechanical keying of the magnetic/electrical coupling within the rotating driving member.

Another aspect of the invention is a mobility device having a joint actuator assembly and a driven component that are coupled together with an enhanced magnetic/electrical coupling system. In exemplary embodiments, the mobility device includes an actuator assembly including a rotating driving member; a driven component that is driven by the rotating driving member; and a magnetic/electrical coupling system comprising a first magnetic/electrical coupling on the actuator assembly that magnetically and electrically couples to a second magnetic/electrical coupling on the driven component. The magnetic/electrical coupling system includes a plurality of magnetic elements located as part of one or both of the first and/or second magnetic/electrical couplings. The first magnetic/electrical coupling includes an electrical element configured to provide an electrical connection to an opposing electrical element of the second magnetic/electrical coupling when the actuator assembly and the driven component are joined together. The mobility device may include one or more of the following features, either individually or in combination.

In an exemplary embodiment of the mobility device, the first magnetic/electrical coupling comprises a ferrous plug including a non-conductive housing that houses a plurality of ferrous coupling components, and the second magnetic/electrical coupling comprises a magnetic receptacle that includes a non-conductive housing that houses the plurality of magnetic elements; and the ferrous coupling components respectively and magnetically couple with the magnetic elements when the actuator assembly and the driven component are joined together.

In an exemplary embodiment of the mobility device, the non-conductive housing of the first magnetic/electric coupling defines a plurality of through-holes that each respectively houses one of the ferrous coupling components, and the non-conductive housing of the second magnetic/electrical coupling defines a plurality of through-holes that each respectively houses one of the magnetic elements.

In an exemplary embodiment of the mobility device, the at least one magnetic coupling component comprises a plurality of ferrous contacts each plated with a conductive metal that is in electrical contact with a respective electrical element of the first magnetic/electrical coupling; and the magnetic elements of the second magnetic/electrical coupling are connected to the opposing electrical elements for electrical connection with the electrical elements on the first magnetic/electrical coupling.

In an exemplary embodiment of the mobility device, the non-conductive housing of the first magnetic/electrical coupling defines a plurality of through-holes that each respectively houses one ferrous contact, and each ferrous contact is undersized relative to the respective through-hole of the housing such that the ferrous contact floats within the respective through-hole.

In an exemplary embodiment of the mobility device, each ferrous contact includes a central body and a shoulder that extends from the central body, and the shoulder interacts against a bottom surface of the housing of the first magnetic/electrical coupling.

In an exemplary embodiment of the mobility device, the central body defines a contact through-hole for placement of the electrical element.

In an exemplary embodiment of the mobility device, the opposing electrical elements are soldered to the magnetic elements of the second magnetic/electrical coupling.

In an exemplary embodiment of the mobility device, the non-conducive housing of the first magnetic/electrical coupling includes six through-holes spaced equidistantly around the housing, the six through-holes housing six respective magnetic coupling components; and the non-conducive housing of the second magnetic/electrical coupling includes six through-holes spaced equidistantly around the housing, the six through-holes housing six respective magnetic elements for magnetically coupling with the six magnetic coupling components.

In an exemplary embodiment of the mobility device, the conductive metal is nickel.

In an exemplary embodiment of the mobility device, the first magnetic/electrical coupling defines a central recess that is configured to receive a protrusion on the second magnetic/electrical coupling when the actuator assembly and the driven component are joined together.

In an exemplary embodiment of the mobility device, the first magnetic/electrical coupling includes a base portion that is attached to the rotational driving member, and there is a clearance between the base portion and the non-conductive housing of the first magnetic/electrical coupling such that the first magnetic/electrical coupling floats within the rotating driving member.

In an exemplary embodiment of the mobility device, the first magnetic/electrical coupling is located in a rotational center of the rotating driving member, and the second magnetic/electrical coupling is located in a rotational center of the driven component.

In an exemplary embodiment of the mobility device, an outer diameter of the non-conductive housing of the first magnetic/electrical coupling includes surface keying features for mechanical keying of the first magnetic/electrical coupling within the rotating driving member.

In an exemplary embodiment of the mobility device, the magnetic coupling components on the first magnetic/electrical coupling include a plurality of magnetic elements of opposite polarity relative to magnetic elements located on the second magnetic/electrical coupling.

In an exemplary embodiment of the mobility device, in the first magnetic/electrical coupling polarity of the magnetic elements is the same for all magnetic elements, and in the second magnetic/electrical coupling polarity is the same for all magnetic elements and opposite to the polarity of the magnetic elements in the first magnetic/electrical coupling.

In an exemplary embodiment of the mobility device, the magnetic coupling system comprises a magnetic keying system that aligns the rotating driving member and the driven component, the magnetic keying system including magnetic elements in each of the rotating driving member and the driven component being installed with alternating and opposite polarity.

In an exemplary embodiment of the mobility device, the magnetic elements are neodymium disc magnets.

In an exemplary embodiment of the mobility device, the rotating driving member comprises an output reel of the actuator assembly that drives the driven component.

In an exemplary embodiment of the mobility device, the mobility device is a legged mobility exoskeleton device comprising: a hip component; at least one thigh assembly including the actuator assembly connected to the hip component at a hip joint; and the driven component is at least one lower leg assembly that is magnetically and electrically coupled to the at least one thigh assembly by the magnetic coupling system at a knee joint.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A mobility device comprising:
an actuator assembly including a rotating driving member;
a driven component that is driven by the rotating driving member; and
a magnetic/electrical coupling system comprising a first magnetic/electrical coupling on the actuator assembly that magnetically and electrically couples to a second magnetic/electrical coupling on the driven component;
wherein the magnetic/electrical coupling system includes a plurality of magnetic elements located as part of one or both of the first and/or second magnetic/electrical couplings; and
the first magnetic/electrical coupling includes an electrical element configured to provide an electrical connection to an opposing electrical element of the second magnetic/electrical coupling when the actuator assembly and the driven component are joined together;
wherein the first magnetic/electrical coupling includes an electrical contact of a conductive material and the second magnetic/electrical coupling includes an opposing electrical contact of a conductive material; and
wherein the electrical contact and the opposing electrical contact come in contact against each other to electrically couple the first magnetic/electrical coupling and the second magnetic/electrical coupling when the first magnetic/electrical coupling and the second magnetic/electrical coupling are joined together.

2. The mobility device of claim 1, wherein the first magnetic/electrical coupling comprises a ferrous plug including a non-conductive housing that houses a plurality of ferrous coupling components, and the second magnetic/electrical coupling comprises a magnetic receptacle that includes a non-conductive housing that houses the plurality of magnetic elements; and
wherein the ferrous coupling components respectively and magnetically couple with the magnetic elements when the actuator assembly and the driven component are joined together.

3. The mobility device of claim 2, wherein the non-conductive housing of the first magnetic/electric coupling defines a plurality of through-holes that each respectively houses one of the ferrous coupling components, and the non-conductive housing of the second magnetic/electrical coupling defines a plurality of through-holes that each respectively houses one of the magnetic elements.

4. The mobility device claim 1, wherein at least one of the first or second magnetic/electrical couplings comprises a plurality of ferrous contacts each plated with a conductive metal to form the electrical contact or the opposing electrical contact.

5. The joint actuator assembly of claim 1, wherein the plurality of magnetic elements includes magnetic elements located on the first magnetic/electrical coupling of opposite polarity relative to magnetic elements located on the second magnetic/electrical coupling.

6. The mobility device of claim 5, wherein in the first magnetic/electrical coupling polarity of the magnetic elements is the same for all magnetic elements, and in the second magnetic/electrical coupling polarity is the same for all magnetic elements and opposite to the polarity of the magnetic elements in the first magnetic/electrical coupling.

7. The mobility device of claim 5, wherein the magnetic coupling system comprises a magnetic keying system that aligns the rotating driving member and the driven component, the magnetic keying system including magnetic elements in each of the rotating driving member and the driven component being installed with alternating and opposite polarity.

8. The mobility device of claim 1, wherein the magnetic elements are neodymium disc magnets.

9. The mobility device of claim 1, wherein the rotating driving member comprises an output reel of the actuator assembly that drives the driven component.

10. The mobility device of claim 1, wherein the mobility device is a legged mobility exoskeleton device comprising:
a hip component;
at least one thigh assembly including the actuator assembly connected to the hip component at a hip joint; and
the driven component is at least one lower leg assembly that is magnetically and electrically coupled to the at least one thigh assembly by the magnetic coupling system at a knee joint.

11. The mobility device of claim 4, wherein the at least one of the first magnetic/electrical coupling and the second magnetic/electrical coupling component includes a non-conductive housing that defines a plurality of through-holes that each respectively houses one ferrous contact, and each ferrous contact is undersized relative to the respective through-hole of the housing such that the ferrous contact floats within the respective through-hole.

12. The mobility device of any of claim 4, wherein each ferrous contact includes a central body and a shoulder that extends from the central body, and the shoulder interacts against a bottom surface of a housing.

13. The mobility device of claim 12, wherein the central body defines a contact through-hole for placement of the electrical element.

14. The mobility device of claim 13, wherein the opposing electrical elements are soldered to the magnetic elements of the second magnetic/electrical coupling.

15. The mobility device of any of claim 3, wherein the non-conducive housing of the first magnetic/electrical coupling includes six through-holes spaced equidistantly around the housing, the six through-holes housing six respective magnetic coupling components; and
the non-conducive housing of the second magnetic/electrical coupling includes six through-holes spaced equidistantly around the housing, the six through-holes housing six respective magnetic elements for magnetically coupling with the six magnetic coupling components.

16. The mobility device of any of claim 4, wherein the conductive metal is nickel.

17. The mobility device of any of claim 1, wherein the first magnetic/electrical coupling defines a central recess that is configured to receive a protrusion on the second magnetic/electrical coupling when the actuator assembly and the driven component are joined together.

18. The joint actuator assembly of any of claim 1, wherein the first magnetic/electrical coupling includes a base portion that is attached to the rotational driving member, and there is a clearance between the base portion and the non-conductive housing of the first magnetic/electrical coupling such that the first magnetic/electrical coupling floats within the rotating driving member.

19. A mobility device comprising:
an actuator assembly including a rotating driving member;
a driven component that is driven by the rotating driving member; and
a magnetic/electrical coupling system comprising a first magnetic/electrical coupling on the actuator assembly that magnetically and electrically couples to a second magnetic/electrical coupling on the driven component;
wherein the magnetic/electrical coupling system includes a plurality of magnetic elements located as part of one or both of the first and/or second magnetic/electrical couplings; and
the first magnetic/electrical coupling includes an electrical element configured to provide an electrical connection to an opposing electrical element of the second magnetic/electrical coupling when the actuator assembly and the driven component are joined together;
wherein the first magnetic/electrical coupling comprises a ferrous plug including a non-conductive housing that houses a plurality of ferrous coupling components, and the second magnetic/electrical coupling comprises a magnetic receptacle that includes a non-conductive housing that houses the plurality of magnetic elements; and
wherein the ferrous coupling components respectively and magnetically couple with the magnetic elements when the actuator assembly and the driven component are joined together.

20. The mobility device of claim 19, wherein the non-conductive housing of the first magnetic/electric coupling defines a plurality of through-holes that each respectively houses one of the ferrous coupling components, and the non-conductive housing of the second magnetic/electrical coupling defines a plurality of through-holes that each respectively houses one of the magnetic elements.

* * * * *